(12) United States Patent
Ha et al.

(10) Patent No.: US 11,209,390 B2
(45) Date of Patent: Dec. 28, 2021

(54) VOLUMETRIC MICRO-INJECTOR FOR CAPILLARY ELECTROPHORESIS

(71) Applicant: THE REGENTS OF THE UNIVERSITY OF CALIFORNIA, Oakland, CA (US)

(72) Inventors: Noel Seunghyun Ha, Los Angeles, CA (US); R. Michael Van Dam, Los Angeles, CA (US); Jimmy Ly, San Francisco, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 58 days.

(21) Appl. No.: 16/339,348

(22) PCT Filed: Oct. 6, 2017

(86) PCT No.: PCT/US2017/055607
§ 371 (c)(1),
(2) Date: Apr. 3, 2019

(87) PCT Pub. No.: WO2018/067976
PCT Pub. Date: Apr. 12, 2018

(65) Prior Publication Data
US 2020/0041451 A1 Feb. 6, 2020

Related U.S. Application Data

(60) Provisional application No. 62/405,158, filed on Oct. 6, 2016.

(51) Int. Cl.
*G01N 27/447* (2006.01)
*B01L 3/00* (2006.01)
*G01N 27/453* (2006.01)

(52) U.S. Cl.
CPC .... *G01N 27/44791* (2013.01); *B01L 3/50273* (2013.01); *B01L 3/502738* (2013.01);
(Continued)

(58) Field of Classification Search
CPC ....... G01N 27/44791; G01N 27/44743; G01N 27/453; B01L 3/50273; B01L 3/502738;
(Continued)

(56) References Cited

U.S. PATENT DOCUMENTS 6,387,234 B1    5/2002  Yeung et al.
9,132,398 B2 *  9/2015  Zhou .................. B01L 3/50273
(Continued)

FOREIGN PATENT DOCUMENTS

WO    WO 2005/049196       6/2005
WO    WO 2016/048687       3/2016
WO    WO 2016/063068 A2    4/2016

OTHER PUBLICATIONS

Supplementary European Search Report dated Jun. 5, 2019 in European Patent Application No. 17859277, (7pages).
(Continued)

*Primary Examiner* — Joshua L Allen
(74) *Attorney, Agent, or Firm* — Vista IP Law Group LLP

(57) ABSTRACT

A volumetric microfluidic injector for capillary electrophoresis (CE) for highly repeatable sample injection has been designed and built to eliminate known injection bias in hydrodynamic injection. A defined volume from 1-10 nL or 0.1-100 nL of sample is confined in a defined region of a micro-valve PDMS microfluidic injector chip and electrophoretic potential is applied to drive sample into a separation device such as an embedded fused silica capillary for separation and detection. Using a 75 μm ID capillary, the RSD of an absorbance peak area as low as 1.32% (n=11) is obtained. As a comparison, the time-dependent injection was
(Continued)

tested using the same chip which resulted in an inferior repeatability.

14 Claims, 16 Drawing Sheets

(52) U.S. Cl.
CPC ..... *G01N 27/44743* (2013.01); *G01N 27/453* (2013.01); *B01L 2400/0421* (2013.01)

(58) Field of Classification Search
CPC ....... B01L 2400/0421; B01L 3/502753; B01L 2300/0867; B01L 2400/0487
See application file for complete search history.

(56) References Cited

U.S. PATENT DOCUMENTS

| | | | | |
|---|---|---|---|---|
| 2005/0106612 | A1* | 5/2005 | Amirkhanian | G01N 21/6428 435/6.11 |
| 2005/0176135 | A1* | 8/2005 | Jones | B01L 3/502707 435/287.2 |
| 2007/0017812 | A1* | 1/2007 | Bousse | G01N 27/44743 204/601 |
| 2008/0223721 | A1* | 9/2008 | Cohen | F16K 99/0026 204/451 |
| 2010/0303687 | A1* | 12/2010 | Blaga | F16K 99/0001 422/504 |
| 2011/0039303 | A1 | 2/2011 | Jovanovich et al. | |
| 2013/0213809 | A1 | 8/2013 | Besselink et al. | |
| 2015/0136604 | A1 | 5/2015 | Nielsen et al. | |
| 2015/0202624 | A9* | 7/2015 | Putnam | B01L 3/502761 422/502 |
| 2016/0187293 | A1 | 6/2016 | Zenhausern et al. | |

OTHER PUBLICATIONS

Communication pursuant to Rule 70(2) and 70a(2) EPC dated Jul. 2, 2019 in European Patent Application No. 17859277, (1page).
Communication pursuant to Article 94(3) EPC dated Apr. 2, 2020 in European Patent Application No. EP17859277.0, (4pages).
PCT International Preliminary Report on Patentability (Chapter I of the Patent Cooperation Treaty) for PCT/US2017/055607, Applicant: The Regents of the University of California, Form PCT/IB/326 and 373, dated Apr. 18, 2019 (7pages).
PCT International Search Report for PCT/US2017/055607, Applicant: The Regents of the University of California, Form PCT/ISA/210 and 220, dated Dec. 28, 2017 (3pages).
PCT Written Opinion of the International Search Authority for PCT/US2017/055607, Applicant: The Regents of the University of California, Form PCT/ISA/237, dated Dec. 28, 2017 (5pages).
Saito, Renata et al., Intrumentation design for hydrodynamic sample injection in microchip electrophoresis: A review, Electrophoresis 2012, 33, 2614-2623.
Karlinsey, James M. et al., Sample introduction techniques for microchip electrophoresis: A review, Analytica Chimica Acta 725 (2012) 1-13.
Bowen, Amanda L. et al., Integration of on-chip peristaltic pumps and injection valves with microchip electrophoresis and electrochemical detection, Electrophoresis 2010, 31, 2534-2540.
Cong, Yongzheng et al., Electrokinetic sample preconcentration and hydrodynamic sample injection for microchip electrophoresis using a pneumatic microvalve, Electrophoresis 2016, 31, 455-462.
Kelly, Ryan T. et al., Pneumatic Microvalve-Based Hydrodynamic Sample Injection for High-Throughput, Quantitative Zone Electrophoresis in Capillaries, dx.doi.org/10.1021/ac501910p, Anal. Chem. 2014, 86, 6723-6729.
Sun, Xuefei et al., Hydrodynamic injection with pneumatic valving for microchip electrophoresis with total analyte utilization, Electrophoresis 2011, 32, 1610-1618.
Li, Michelle W. et al., Design and Characterization of Poly(dimethylsiloxane)-Based Valves for Interfacing Continous-Flow Sampling to Microchip Electrophoresis, Anal. Chem. 2006, 78, 1042-1051.
Xu, Yuan et al., Development of fully automated quantitative capillary electrophoresis with high accuracy and repeatability, Biomed. Chromatogr. 2016, 30, 390-395.
Mayer, B.X., How to increase precision in capillary electrophoresis, Journal of Chromatography A, 907 (2001) 21-37.
Schaeper, James P. et al., Parameters affecting reproducibility in capillary electrophoresis, Electrophoresis 2000, 21, 1421-1429.
Holzgrabe, Ulrike et al., Why not using capillary electrophoresis in drug analysis?, Electrophoresis 2006, 27, 2283-2292.
Cianciulli, Claudia et al., Analytical instrument qualification in capillary electrophoresis, Electrophoresis 2012, 33, 1499-1508.
Response to extended European search report dated Jan. 13, 2020 in European Patent Application No. EP17859277.0, (54 pages).
Reply to communication pursuant to Article 94(3) EPC dated Oct. 12, 2020 in European Patent Application No. EP17859277.0, (15 pages).

\* cited by examiner

Table 1. Summary of peak area RSD (%) for mixture samples

|  | Volumetric injection | | Electrokinetic injection |
| --- | --- | --- | --- |
|  | Perpendicular junction (n=4) | Collinear junction (n=3) | Collinear junction (n=3) |
| thymidine | 0.40 | 0.55 | 7.13 |
| stavudine | 1.59 | 1.70 | 7.86 |
| FLT | 1.78 | 0.65 | 7.79 |
| CLT | 1.93 | 1.69 | 5.78 |

*FIG. 9*

VOLUMETRIC MICRO-INJECTOR FOR CAPILLARY ELECTROPHORESIS

RELATED APPLICATION

This Application is a U.S. National Stage filing under 35 U.S.C. § 371 of International Application No. PCT/US2017/055607, filed Oct. 6, 2017, which claims priority to U.S. Provisional Patent Application No. 62/405,158 filed on Oct. 6, 2016, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with Government support under Grant No. AG049918 awarded by the National Institutes of Health and Grant No. DE-SC0001249 awarded by the Department of Energy. The Government has certain rights in the invention.

TECHNICAL FIELD

The technical field generally relates to devices and methods used for the volumetric injection of fluids. In particular, the technical field of the invention relates to a volumetric micro-injector for capillary electrophoresis (CE) that yields high injection repeatability that does not include injection bias commonly found in hydrodynamic injection.

BACKGROUND

Capillary electrophoresis (CE) is a well-known chemical separation technique, which has the advantages of high efficiency, high resolution, low consumption of sample and reagent, and simple instrumentation compared to other conventional separation methods, such as high-performance liquid chromatography (HPLC). (See, e.g., E. González-Peñas, C. Leache, A. López de Cerain, and E. Lizarraga, "Comparison between capillary electrophoresis and HPLC-FL for ochratoxin A quantification in wine," *Food Chem.*, vol. 97, no. 2, pp. 349-354, July 2006; and T. Faller and H. Engelhardt, "How to achieve higher repeatability and reproducibility in capillary electrophoresis," *J. Chromatogr. A*, vol. 853, no. 1-2, pp. 83-94, August 1999). All publications cited herein are incorporated by reference in their entireties.

Unlike HPLC, CE can also be readily miniaturized into microfluidic chips. (See e.g., E. R. Castro and A. Manz, "Present state of microchip electrophoresis: State of the art and routine applications," *J. Chromatogr. A*, vol. 1382, pp. 66-85, February 2015; and A. P. Lewis, A. Cranny, N. R. Harris, N. G. Green, J. A. Wharton, R. J. K. Wood, and K. R. Stokes, "Review on the development of truly portable and in-situ capillary electrophoresis systems," *Meas. Sci. Technol.*, vol. 24, no. 4, p. 042001, April 2013.

"Microchip electrophoresis" (MCE) is especially important for applications that require portability, compactness, or low instrument cost. CE and MCE are employed in diverse applications including DNA and protein separation, detection of disease biomarkers, environmental pollutant monitoring, food (e.g. wine) analysis, and pharmaceutical analysis. (See, e.g., G. G. Mironov, C. M. Clouthier, A. Akbar, J. W. Keillor, and M. V. Berezovski, "Simultaneous analysis of enzyme structure and activity by kinetic capillary electrophoresis-MS," *Nat. Chem. Biol.*, vol. advance online publication, September 2016; G. G. Morbioli, T. Mazzu-Nascimento, A. Aquino, C. Cervantes, and E. Carrilho, "Recombinant drugs-on-a-chip: The usage of capillary electrophoresis and trends in miniaturized systems—A review," *Anal. Chim. Acta*, vol. 935, pp. 44-57, September 2016; Z. Yang and J. V. Sweedler, "Application of capillary electrophoresis for the early diagnosis of cancer," *Anal. Bioanal. Chem.*, vol. 406, no. 17, pp. 4013-4031, March 2014; S.-K. Ruokonen, F. Duša, J. Lokajová, I. Kilpeläinen, A. W. T. King, and S. K. Wiedmer, "Effect of ionic liquids on the interaction between liposomes and common wastewater pollutants investigated by capillary electrophoresis," *J. Chromatogr. A*, vol. 1405, pp. 178-187, July 2015; A. M. Skelley, J. R. Scherer, A. D. Aubrey, W. H. Grover, R. H. C. Ivester, P. Ehrenfreund, F. J. Grunthaner, J. L. Bada, R. A. Mathies, Development and evaluation of a microdevice for amino acid biomarker detection and analysis on Mars, Proc. Natl. Acad. Sci. U.S.A. 102 (2005) 1041-1046. doi:10.1073/pnas.0406798102; F. J. V. Gomez and M. F. Silva, "Microchip electrophoresis for wine analysis," *Anal. Bioanal. Chem.*, pp. 1-11, August 2016; E. A. Redman, J. S. Mellors, J. A. Starkey, and J. M. Ramsey, "Characterization of Intact Antibody Drug Conjugate Variants Using Microfluidic Capillary Electrophoresis-Mass Spectrometry," *Anal. Chem.*, vol. 88, no. 4, pp. 2220-2226, February 2016; E. Tamizi and A. Jouyban, "The potential of the capillary electrophoresis techniques for quality control of biopharmaceuticals—A review," *Electrophoresis*, vol. 36, no. 6, pp. 831-858, March 2015; L. Suntornsuk, "Recent advances of capillary electrophoresis in pharmaceutical analysis," *Anal. Bioanal. Chem.*, vol. 398, no. 1, pp. 29-52, September 2010.

CE and MCE, however, have often been considered to have inferior reproducibility compared to other separation techniques such as HPLC or gas chromatography (GC). Thus, there has not been as widespread use of CE or MCE in quantitative analysis. (See, e.g., Y. Xu, B. Ling, W. Zhu, D. Yao, L. Zhang, Y. Wang, and C. Yan, "Development of fully automated quantitative capillary electrophoresis with high accuracy and repeatability," *Biomed. Chromatogr.*, vol. 30, no. 3, pp. 390-395, March 2016; and B. X. Mayer, "How to increase precision in capillary electrophoresis," *J. Chromatogr. A*, vol. 907, no. 1-2, pp. 21-37, January 2001).

Numerous advances have largely eliminated this concern in recent years, though achieving the desired degree of reproducibility (e.g. peak area relative standard deviation (RSD)<2%) remains a challenge in many cases. (See, e.g., U. Holzgrabe, D. Brinz, S. Kopec, C. Weber, and Y. Bitar, "Why not using capillary electrophoresis in drug analysis?," *ELECTROPHORESIS*, vol. 27, no. 12, pp. 2283-2292, 2006; M. C. Breadmore, "Capillary and microchip electrophoresis: Challenging the common conceptions," *J. Chromatogr. A*, vol. 1221, pp. 42-55, January 2012; C. Cianciulli and H. Wätzig, "Analytical instrument qualification in capillary electrophoresis," *Electrophoresis*, vol. 33, no. 11, pp. 1499-1508, June 2012).

In MCE, both electrokinetic and hydrodynamic injection modalities have been extensively studied, each with their own advantages and disadvantages. In electrokinetic injection, the amount injected depends on the applied potential and injection time. This method can suffer from injection bias, however, due to the different electrophoretic mobility of different species, making accurate quantitation of impurities very difficult. To inject a sample plug that is representative of the original sample, hydrodynamic (pressure-driven) injection has been used, in which a valve or pump is actuated for a certain time to control the amount injected. Relative standard deviation (RSD) of peak area in the range of 1.77 to 5% has been reported. (See, e.g., M. W. Li, B. H. Huynh, M. K. Hulvey, S. M. Lunte, and R. S. Martin, "Design and characterization of poly(dimethylsiloxane)-based valves for interfacing continuous-flow sampling to microchip electrophoresis," *Anal. Chem.*, vol. 78, no. 4, pp. 1042-1051, February 2006; J. M. Karlinsey, "Sample introduction techniques for microchip electrophoresis: A review," *Anal. Chim. Acta*, vol. 725, pp. 1-13, May 2012). However, the consistency of injection from sample to sample can still be affected in this approach by sample viscosity, stability of pressure source, and potential variation in the response time of micro-valves, etc. (See, e.g., J. P. Schaeper and M. J. Sepaniak, "Parameters affecting reproducibility in capillary electrophoresis," *ELECTROPHORESIS*, vol. 21, no. 7, pp. 1421-1429, April 2000).

SUMMARY

Generally, the invention described herein focuses on improving the sample injection process to achieve high sample injection repeatability to the level needed for quality control (QC) testing of short-lived radioactive positron emission tomography (PET) tracers and other applications. To further improve the consistency of injection suitable for chemical purity analysis, a novel volumetric micro-injector (also referred to as a microfluidic injector) for capillary electrophoresis (CE) for highly repeatable sample injection has been developed which eliminates known biases in electrokinetic and hydrodynamic injection. The micro-injector chip may be made of poly(dimethylsiloxane) (PDMS). The micro-injector chip contains a channel segment (i.e., a microfluidic injecting channel) with a well-defined volume. Similar to the operation of an HPLC injection valve, the microfluidic injecting channel serves as an injection loop. Using a series of on-chip located micro-valves, the microfluidic injecting channel can be connected to a sample source during a "loading" step, and to a CE separation channel during the "injection" step. For the injection step, the valves along the CE flow path are opened and electrophoretic potential is applied to separate the sample.

Accordingly, one embodiment of the present invention is directed to a micro-injector (microfluidic chip) for capillary electrophoresis. As used herein, the term "micro-injector" and "microfluidic" refer to devices configured to handle small amounts of sample fluids having volumes of less than 100 nL (nanoliters), and which have fluid handling channels having a width of less than 250 μm, or less than 100 μm. The micro-injector includes a microfluidic device having a microfluidic injection channel connected to a buffer supply (e.g., a buffer well, a buffer reservoir, a buffer container connected to the injection channel via a tube and/or channel), one or more input channels, and one or more waste channels. The one or more input channels, the one or more waste channels, and the microfluidic injection channel contain selectively controllable valves therein which can be opened and closed to open and close the respective channel. A defined volume is formed in the microfluidic injection channel between two or more of the controllable valves. A fused silica capillary is coupled to an output of the microfluidic injection channel.

In another aspect, a power supply is coupled to the micro-injector and is configured to apply a CE separation voltage between the buffer well and an output of the silica capillary. For example, a first electrode of the power supply may be connected to the buffer well, and a second electrode of the power supply may be connected to an output end of the capillary, such as a waste well at the output end of the capillary.

In additional aspects, the micro-injector may include any combination of one or more of the following features: the valves may be push-up valves; the defined volume may be from 2 nL to 4 nL, from 2 nL to 6 nL, from 3 nL to 6 nL, from 1 nL to 10 nL, from 0.1 nL to 100 nL less than 6 nL, or less than 10 nL; the defined volume may be contained between first and second valves located in the microfluidic injection channel; the micro-injector may also include an optical absorbance detector configured to measure absorbance along a portion of the silica capillary; and/or the micro-injector may have a peak area relative standard deviation (RSD)<2%.

Another embodiment of the present invention is directed to a method of using the micro-injector. The method includes priming the microfluidic injection channel with a buffer using an inlet channel and a waste channel. A plug of sample having the defined volume is isolated in the microfluidic injection channel between at least two valves. Then, any valves in the microfluidic injection channel are opened, and any valves in any connecting channels are closed and a CE separation voltage is applied thereby causing the plug of sample to flow into the silica capillary. The method of using the micro-injector may also include any combination of the additional aspects of the micro-injector, as described above. In another aspect, the sample may be a fluid having a suspension of a radioactive tracer, a PET tracer, DNA, protein(s), disease biomarkers, a pharmaceutical compound, a food product, or other material to be separated and detected using CE separation.

In still another embodiment, the present invention is directed to another microfluidic injector for capillary electrophoresis. The microfluidic injector includes a substrate, such as a chip or multi-layer chip, in which the fluid handling features are formed. The substrate has the following fluid handling features formed in the substrate: an injection channel, a buffer well, a capillary port, a sample inlet channel, a buffer inlet channel, and a first waste channel. The injection channel has a first end connected to the buffer well and a second end connected to the capillary port. The sample inlet channel, buffer inlet channel and first waste channel are each connected to the injection channel at different locations of the injection channel.

Selectively controllable valves are disposed in each of the channels. A first valve (sample inlet valve) is disposed in the sample inlet channel, a second valve (buffer inlet valve) is disposed in the buffer inlet, a third valve (first waste channel valve) is disposed in the first waste channel, a fourth valve (first injection channel valve) is disposed in the injection channel, and a fifth valve (second injection channel valve) is also disposed in the injection channel. The fourth valve is positioned such that closing the fourth valve seals the buffer well from the sample inlet channel, buffer inlet channel and waste channel. The fifth valve is positioned such that closing the fifth valve seals the capillary port from the sample inlet channel, buffer inlet channel and a first waste channel. A first sample chamber having a first defined volume is formed in the injection channel by and between the fourth valve and the fifth valve.

In another aspect of the microfluidic injector, a silica capillary may be connected to the capillary port.

In yet another aspect of the microfluidic injector, each of the valves may be a pressure-actuated valve, such as a push-up valve. In such case, the substrate may further include a separate control channel connected to each of the valves for selectively applying a pressurized fluid to selectively actuate the respective valves.

In an additional feature, the microfluidic injector may also include a power supply configured to apply a capillary electrophoresis separation voltage between the buffer well and an output of the silica capillary. For instance, a first electrode of the power supply may be connected to the buffer well, and a second electrode of the power supply may be connected to an output end of the capillary, such as a waste well or vial at the output end of the capillary.

In additional aspects, the microfluidic injector may include any combination of one or more of the following features: the valves may be push-up valves; the defined volume may be from 2 nL to 4 nL, from 2 nL to 6 nL, from 3 nL to 6 nL, from 1 nL to 10 nL, from 0.1 nL to 100 nL less than 6 nL, or less than 10 nL; the defined volume may be contained between first and second valves located in the microfluidic injection channel; the micro-injector may also include an optical absorbance detector configured to measure absorbance along a portion of the silica capillary; each of the injection channel, sample inlet channel, a buffer inlet channel and waste channel may be less than 250 µm or less than 100 µm in width; the substrate may be formed of one or more layers of poly(dimethylsiloxane) (PDMS), perfluoropolyether (PFPE), or other suitable material, and the injection channel, sample inlet channel, buffer inlet channel and first waste channel may be formed in the one or more layers of poly(dimethylsiloxane) using photolithography; and/or the microfluidic injector may have a peak area relative standard deviation (RSD)<2%.

In still another feature, the microfluidic injector may be configured to be capable of isolating a plug of sample of differing defined volumes. The substrate further comprises a second waste channel connected to the injection channel between the fourth valve and fifth valve. A sixth valve (second wasted channel valve) is disposed in the second waste channel, and a seventh valve (third injection channel valve) is disposed in the injection channel proximate the connection between second waste channel and the injection channel. A second sample chamber having a second defined volume is formed in the injection channel between the seventh valve and the fourth valve, wherein the second defined volume is less than the first defined volume. This feature allows a sample to be loaded into the injection channel between seventh valve and the fourth valve wherein the plug of sample has the second defined volume.

Another embodiment of the present invention is directed to a method of using the microfluidic injector. The method includes priming the injection channel with a buffer by injecting buffer into the buffer inlet channel with the second valve, fourth valve, fifth valve (and optionally the third valve) open, until buffer fills the injection channel, the buffer well, and the silica capillary (and optionally the first waste channel). Next, the first sample chamber is loaded with a sample by injecting sample into the sample inlet channel with the first and third valves open, and the second, fourth and fifth valves closed, until sample fills the first sample chamber. A full sample chamber may be confirmed by detecting that sample is exiting the injection channel through the first waste channel. The first valve and the third valve are then closed, such that a plug of sample having the first defined volume is contained in the first sample chamber between the fourth valve and the fifth valve. The plug of sample is then injected into the silica capillary by applying a voltage across the injection channel with the fourth and fifth valves open, and the first, second and third valves closed.

The method of using the microfluidic injector may also include any combination of the additional aspects of the microfluidic injector, as described above.

Another embodiment of the present invention is directed to a method of using the microfluidic injector having a second waste channel, as described above. The method includes priming the injection channel with a buffer by injecting buffer into the buffer inlet channel with the second, third, fourth, fifth, and seventh valves open, until buffer fills the injection channel, the buffer well, and the silica capillary. The second sample chamber is loaded with a sample by injecting sample into the sample inlet channel with the first and sixth valves open, and the second, fourth and sixth valves closed, until sample fills the second sample chamber. A full second sample chamber may be confirmed by detecting sample exiting the injection channel through the second waste channel. Then, the first valve and the sixth valve are closed, such that a plug of sample having the second defined volume is contained in the second sample chamber between the fourth valve and the seventh valve. Finally, the plug of sample is injected into the silica capillary by applying a voltage across the injection channel with the fourth, fifth and seventh valves open, and the first, second, third and sixth valves closed.

The method of using the microfluidic injector having a second waste channel may also include any combination of the additional aspects of the microfluidic injector, as described above.

BRIEF DESCRIPTION OF THE DRAWINGS

The foregoing and other aspects of embodiments are described in further detail with reference to the accompanying drawings, wherein like reference numerals refer to like elements (e.g., elements having the same number are considered like elements, such as 50a and 50b) and the description for like elements shall be applicable for all described embodiments wherever relevant.

FIG. 9 is a table summarizing peak area RSD values for the separation of 4 compounds using various embodiments the microfluidic injector CE system of the present invention.

DETAILED DESCRIPTION OF ILLUSTRATED EMBODIMENTS

Figure 1:
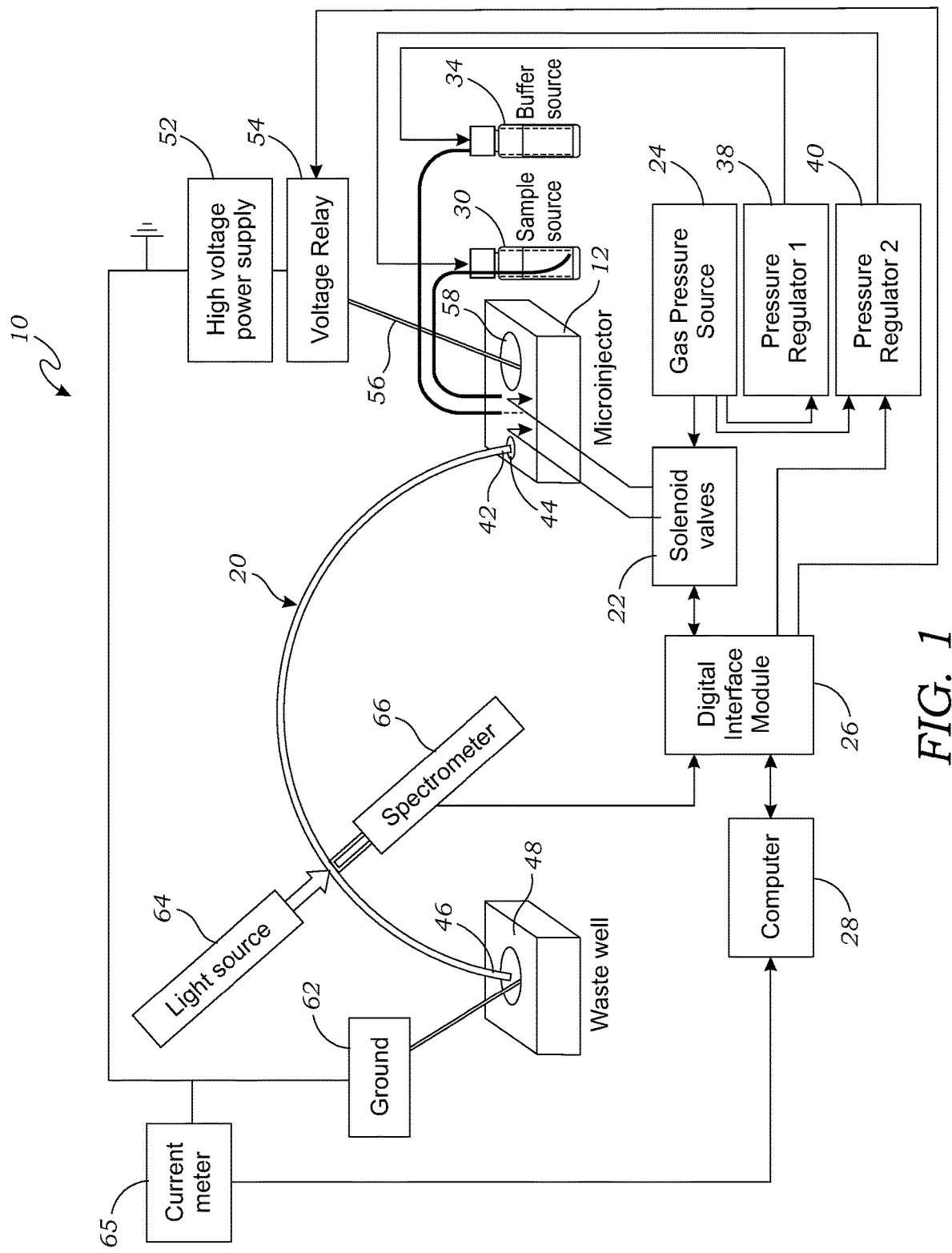
FIG. 1 is a schematic view of a microfluidic CE system which utilizes a microfluidic injector (micro-injector) device, according to one embodiment of the present invention.

FIG. 1 illustrates a CE system 10 which utilizes a microfluidic injector 12 for capillary electrophoresis (CE), according to one embodiment of the present invention. The microfluidic injector 12 is configured to handle a buffer fluid and sample fluid to isolate a plug of sample having a defined volume and inject the plug of sample into a separation device 20. As described in more detail below, the microfluidic injector includes a plurality of microfluidic channels 14, micro-valves 16 (referred to as "valves 16") disposed in the channels 14, and control channels 18 (see FIG. 2) each operably coupled to a respective valve 16 for controlling the operation of the micro-valves 16h. The separation device 20 may be a fused silica capillary 20 (20 cm in length and 75 µm I.D.) as shown in the illustrated embodiment, or other suitable electrophoresis separation device.

The CE system 10 includes a series of computer-controlled valves 22 connected to each of the control channels 18 in order to control the actuation of the micro-valves 16. In the described embodiments, the micro-valves 16 are fluid pressure actuated valves and the computer-controlled valves 22 selectively control fluid pressure to the micro-valves 16 in order to open and close the micro-valves 16. Hence, in the described embodiment, the computer-controlled valves 22 may be solenoid valves, or other suitable valve for selectively controlling a fluid pressure. Each of the computer-controlled valves 22 has a respective inlet connected to a gas pressure source 24 and a respective outlet connected to a respective one or more of the control channels 18. The gas pressure source 24 may be shop compressed air or a pressurized nitrogen supply, or other suitable source of gas pressure. The control channels 18 may be filled with water or other liquid in order to remove air from the control channels 18 which can permeate through the substrate 50. The computer-controlled valves 22 are operably coupled to a digital interface module 26. The digital interface module 26 is operably coupled to a computer 28, such that the computer 28 and digital interface module 26 can control the actuation of the computer-controlled valves 22, and in turn, the actuation of the micro-valves 16.

Still referring to FIG. 1, the CE system 10 has a sample source 30 (e.g., a sample vial or other container filled with sample) containing a fluid sample connected to a sample inlet channel 14a of the micro-injector 12, and a buffer source 34 (e.g., a buffer vial or other container filled with buffer) containing a fluid buffer solution connected to a buffer inlet channel 14b of the micro-injector 12. The sample source 30 is also connected to a first pressure regulator 38 which is connected to the gas pressure source 24, so that sample can be injected into the sample inlet channel 32. Similarly, the buffer source 34 is connected to a second pressure regulator 40 which is connected to the gas pressure source 24 so that buffer can be injected into the buffer inlet channel 36.

The separation device 20 has an inlet end 42 connected to a capillary port 44 (outlet port) of the microfluidic injector 12, an outlet end 46 connected to a waste well 48. The waste well 48 may be a PDMS-based waste well, and may be located on the same substrate 50 forming the microfluidic injector 12 or a different substrate ("chip").

In some embodiments, the separation device 20 is provided using a microfluidic capillary channel formed in, or disposed on, the same substrate 50 of the microfluidic injector 12, for example, within a separation channel, or other channel formed on the substrate 50.

The CE system 10 also includes a power supply 52 coupled to a computer-controlled voltage relay 54 for selectively applying a voltage across an injection channel 14c of the microfluidic injector 12 and the separation device 20. The voltage applied by the power supply 52 provides the electrophoretic potential for driving a fixed volume of sample from the injection channel 14c into and through the separation device for separation and detection. The voltage relay 54 has a first electrode 56 which is coupled to an injector buffer well 58 of the microfluidic injector 12, and a second electrode 60 which is coupled to a ground 62 and the waste well 48 to complete the electrical circuit. A current meter 60S is connected to the electrical circuit to measure current in the circuit and interfaces with the computer 28 and/or digital interface module 26. Separation detection within the separation device 20 is accomplished using a light source 64 (e.g., a deuterium light source) and a spectrophotometer 66. Mounting devices, such as sleeves, are mounted on the separation device 20 for mounting a light source fiber coupled to the light source 64 and a detection fiber coupled to the spectrophotometer 66. The spectrophotometer 66 measures absorbance of light from the light source 64 as a sample passes through the separation device 20. The spectrophotometer 66 also interfaces with the digital interface module 26 such that measurements obtained by the spectrophotometer 66 are transmitted to the computer 28 via the digital interface module 26.

Figure 2A:
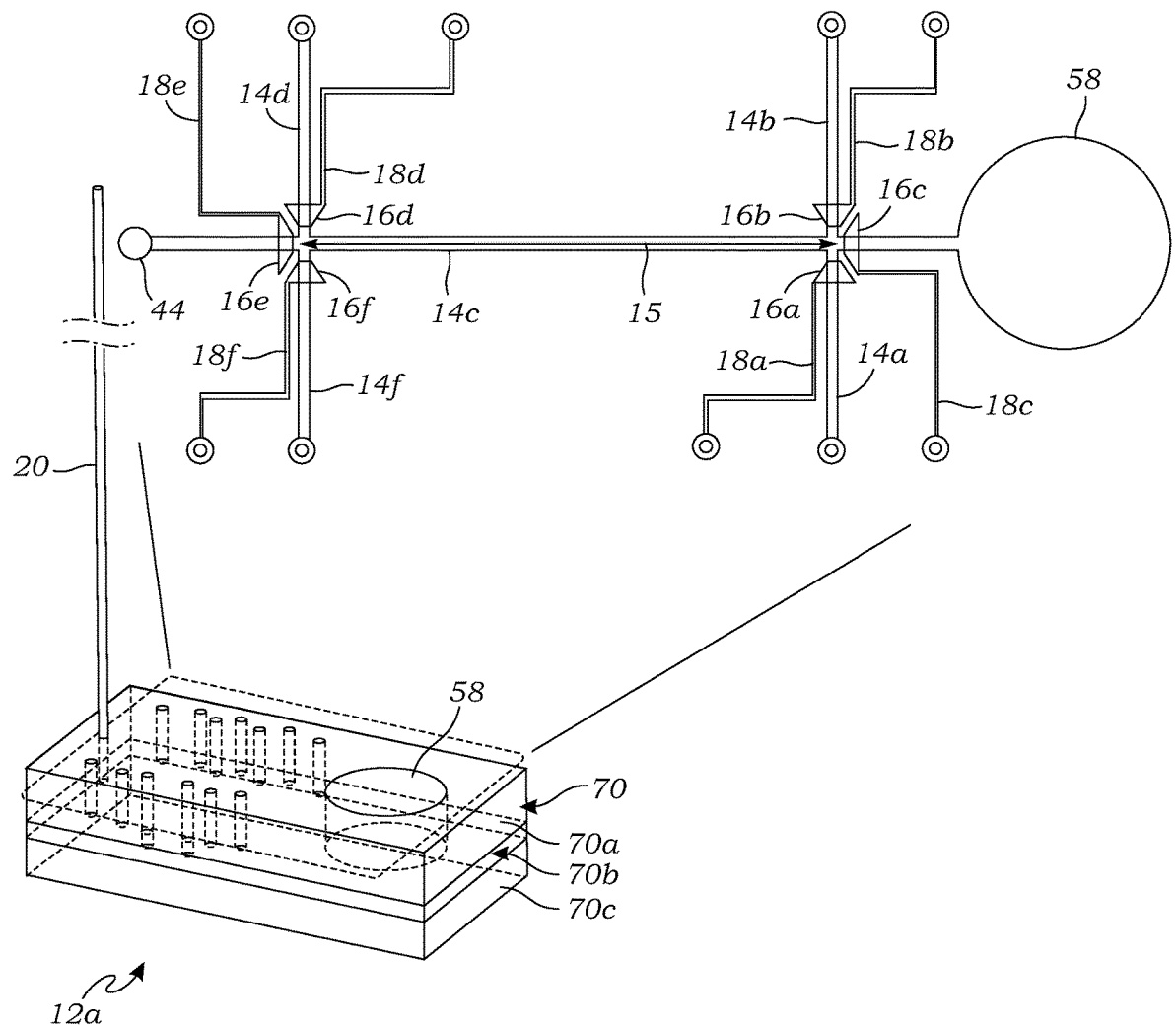
FIG. 2A is a perspective view of the microfluidic injector device along with a schematic illustrating the detailed design of the microfluidic channels and valves that form the fixed volume microfluidic injector, according to one embodiment of the present invention.
Figure 2B:
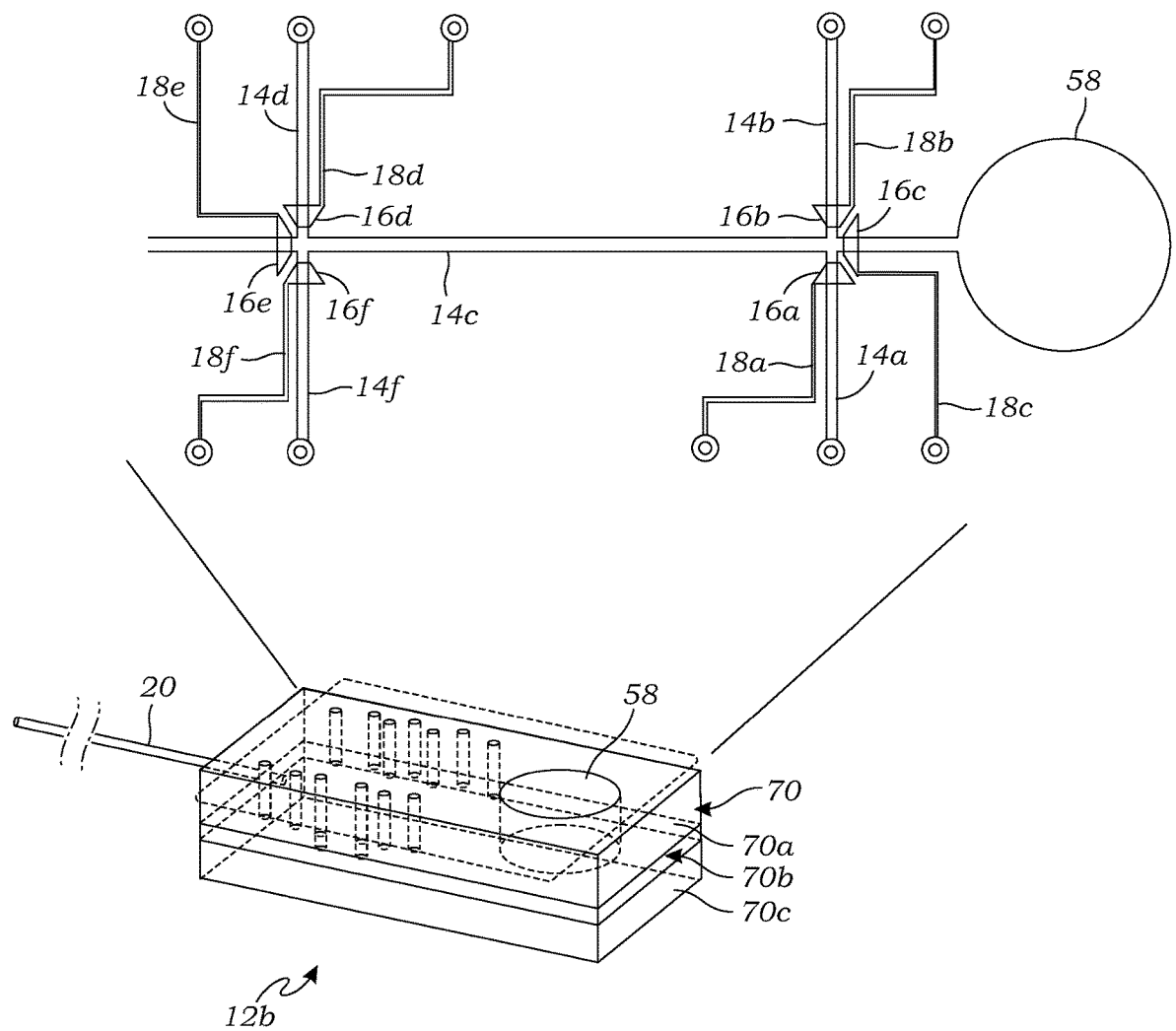
FIG. 2B is a perspective view of the microfluidic injector device along with a schematic illustrating the detailed design of the microfluidic channels and valves that form the fixed volume microfluidic injector, according to another embodiment of the present invention.
Figure 2C:
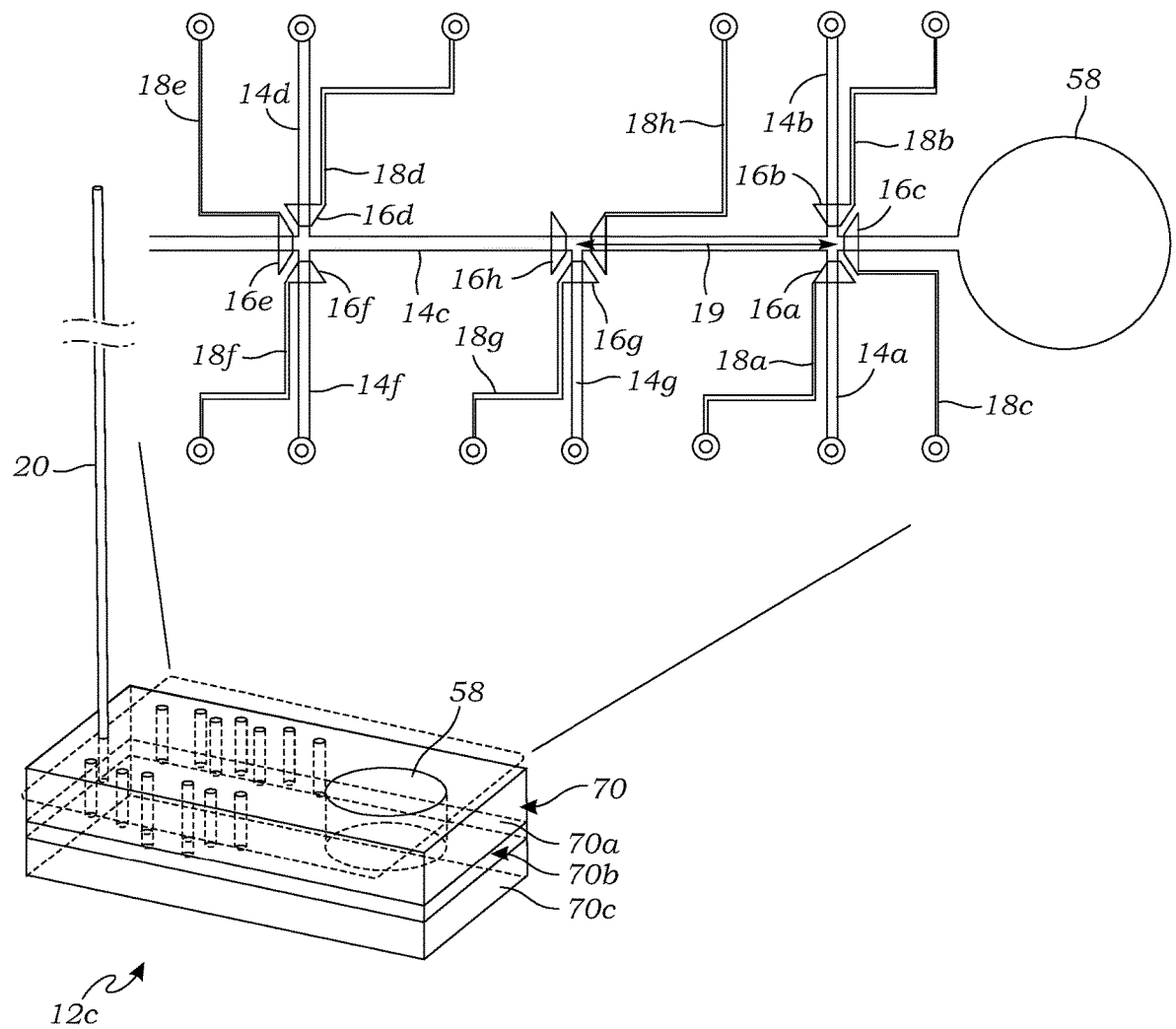
FIG. 2C is a perspective view of the microfluidic injector device along with a schematic illustrating the detailed design of the microfluidic channels and valves that form the fixed volume microfluidic injector, according to yet another embodiment of the present invention.

Turning to FIGS. 2A-2C, three different embodiments of the microfluid injector 12 of the CE system 10 are illustrated. The three different microfluidic injectors 12 have many of the same or substantially similar features such that same or similar elements in each of the three embodiments have like reference numerals and the description with respect to one of the embodiments applies to the other embodiments. Referring first to the embodiment illustrated in FIG. 2A, the microfluid injector 12a comprises a substrate 70 such as a chip or multi-layer chip, in which the fluid sample handling elements are formed. The fluid handling elements include the injection channel 14c, the buffer well 58, the capillary port 44, the sample inlet channel 14a (first inlet channel 14a), the buffer inlet channel 14b (second inlet channel 14b), and a first waste channel 14d. The microfluidic injector 12 also includes an optional auxiliary waste channel 14f. The control channels 18a-18f are also formed in the substrate 70.

The injection channel 14c has a first end connected to the buffer well 58 and a second end connected to the capillary port 44. The sample inlet channel 14a, buffer inlet channel 14b, first waste channel 14d and optional, auxiliary waste channel 14f are each connected to the injection channel 14c at different locations of the injection channel 14c.

Selectively controllable micro-valves 16a-16f (also referred to as "valves") are disposed in each of the channels 14a-14f. The valves 16 are located in the connecting channels 14a, 14b, 14d 14f (channels connecting to the injection channel 14c) just before (at or proximate to) the junction to the injection channel 14c. A first valve 16a (sample inlet valve 16a) is disposed in the sample inlet channel 14a, a second valve 16b (buffer inlet valve 16b) is disposed in the buffer inlet 14b, a third valve 16d (first waste channel valve 16d) is disposed in the first waste channel 14d, a fourth valve 16c (first injection channel valve 16c) is disposed in the injection channel 14c upstream of the junction of the injection channel 16c to the connecting channels 16a, 16b, 16, 16f (proximate an upstream end of the injection channel, a fifth valve 16e (second injection channel valve 16e) is disposed in the injection channel 14c downstream of the junction of the injection channel 16c to connecting channels 16a, 16b, 16, 16f (proximate a downstream end of the injection channel 14c), and a sixth valve 16f (auxiliary waste channel valve 16f) is disposed in the auxiliary waste channel 14f. The terms "downstream" and "upstream" as used herein are relative to the flow of fluid through the injection channel 14c from an upstream end of the injection channel 14c to a downstream end of the injection channel 14c connected to the output port 44. The fourth valve 16c is positioned along the injection channel 14c such that closing the fourth valve 16c seals the buffer well 58 from the sample inlet channel 14a, buffer inlet channel 14b and first waste channel 14d. The fifth valve 16e is positioned along the injection channel 14c such that closing the fifth valve 16e seals the capillary port 44 from the sample inlet channel 14a, buffer inlet channel 14b and first waste channel 14d. The portion of the injection channel 14c between the fourth valve 16c and the fifth valve 16e forms a first sample chamber 15 having a first defined volume. A volume of sample having the first defined volume contained in the first sample chamber 15 by isolating the volume of sample between the fourth valve 16c and the fifth valve 16e is referred to as a "sample plug" or "plug of sample."

Figure 6:
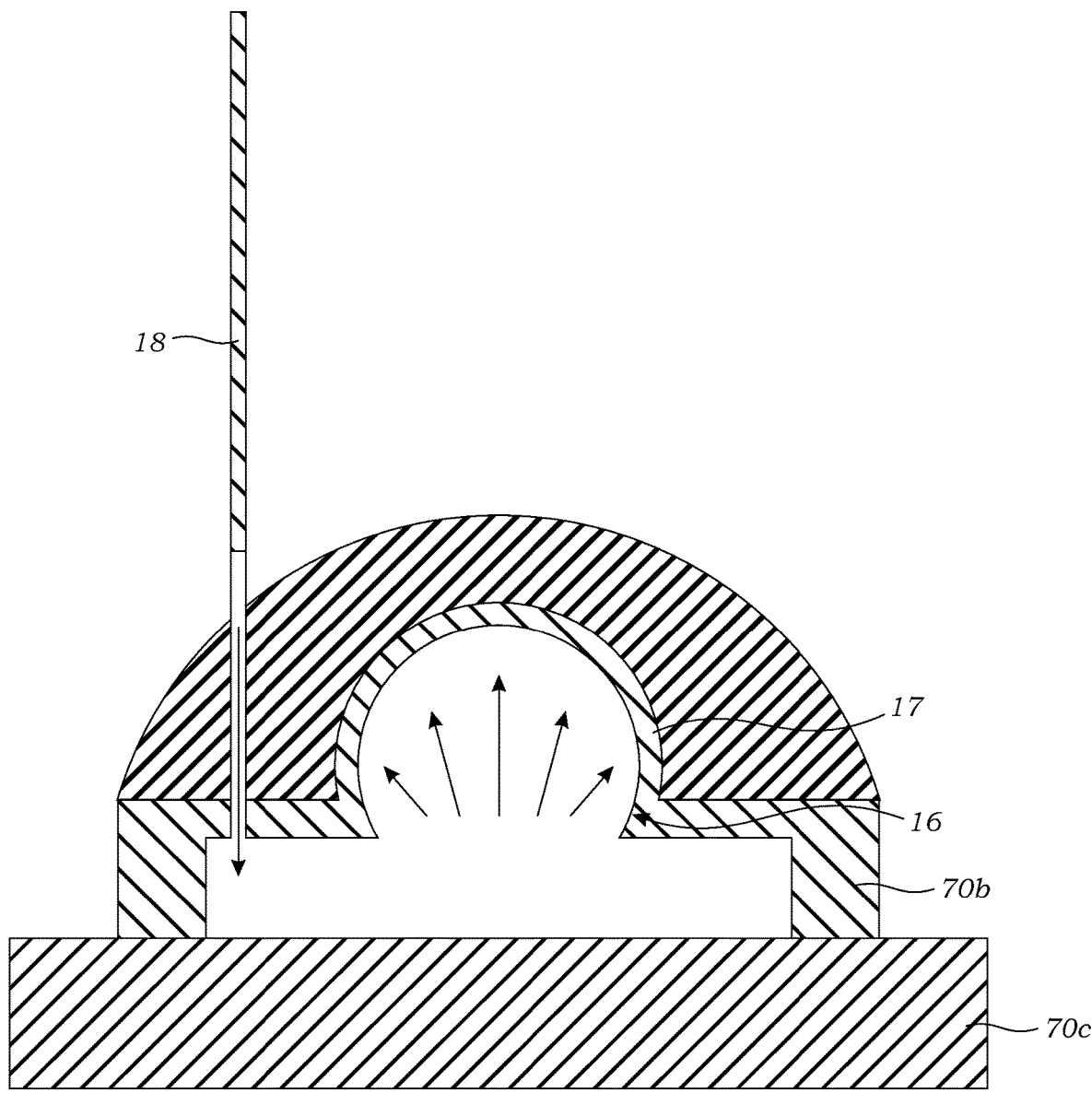
FIG. 6 illustrates a schematic representation of a push-up valve that may be used with the microfluidic injector, according to one embodiment of the present invention.

The micro-valves 16 may be any suitable controllably actuatable valve. For example, the micro-valves 16 may be pressure-actuated valves, such as push-up valves 16 which utilize so-called push-up valve architecture. In push-up valves, the microfluidic channel 14 that carries the flow of fluid has a flexible diaphragm or membrane 17 that is actuated by the respective, separate control channel 18 (shown in FIG. 2 connected to each valve 16). FIG. 6 illustrates a schematic view of one embodiment of a push-up valve 16. For example, a fluid that is driven or pressurized by compressed gas such as air that is controlled via the computer-controlled valves 22 can be used to selectively actuate the valve 16 causing deflection of a diaphragm or membrane 17 to "close" the microfluidic channel 14 to fluid flow. The air or gas may be used to drive another fluid such as water that expands the flexible diaphragm or membrane 17 when the actuation or control channel is actuated. The valve 16 can be relaxed and returned to its "open" state by not applying, or releasing, the pressure of the actuation fluid in the control channel 18.

As shown in FIG. 2A, a respective one of the control channels 18a-18f is operably coupled to a respective one of the valves 16a-16f. As explained above, a respective computer-controlled valve 22 is connected to each of the control channels 18a-18f in order to independently control the actuation (i.e., the opening and closing) of a respective one of the micro-valves 16.

In the illustrated embodiment of FIG. 2A, the substrate 70 has 2 layers of PDMS, a control channel layer 70a and a fluid channel layer 70b, which are bonded together and then bonded to a base layer 70c. The microfluidic channels 14 are formed in the fluid channel layer 70b, and the control channels 18 are formed in the control channel layer 70b. The substrate 70 may be manufactured of PDMS using a multilayer soft lithography process. In this molding process, a mold for each layer 70a, 70b is fabricated using a photolithographic process. The molds are then used to fabricate each layer 70a, 70b from PDMS. In one exemplary product used for the experiments described below, a mold for the fluid channel layer 70b was fabricated from a 4" silicon wafer using a SU-8 2010 negative photoresist, and a mold for the control channel layer 70b was fabricated from a second 4" silicon wafer using a SPR 220-7.0 positive photoresist. The control 18 channels were 15 μm deep and 75 μm wide and were rectangular in cross section. The microfluidic channels 14 were 20 μm deep and 75 μm wide and were rounded in cross section to enable complete channel sealing when the respective valves 16 were actuated to a closed state. The first defined volume (i.e., sample plug volume) within the first sample chamber 15 was designed to be about 4 nL in volume (other volumes could also be formed, such as from 2 nL to 4 nL, from 2 nL to 6 nL, from 3 nL to 6 nL, from 1 nL to 10 nL, from 0.1 nL to 100 nL less than 6 nL, or less than 10 nL). Once the control channel layer 70a and fluid channel layer bonding was complete, the chips were removed from the control wafer mold. A manual press equipped with metal punches was then used to create access to channel for fluidic and control lines, and an output port for a fused silica capillary. A 75 μm I.D., 375 μm O.D. Teflon coated fused-silica capillary with a total length of 20 cm was inserted into the PDMS injector chip. The silica capillary may be "sharpened", e.g. via mechanical sanding/polishing prior to insertion into the channel. The combined chip (fluid and control layers) was then bonded to the flat PDMS substrate using a corona discharge. The other end of capillary is positioned to be submerged in buffer solution inside the separate waste reservoir also made with PDMS.

As shown in FIG. 2A, the microinjector 12a is connected to the separation device 20 with a perpendicular junction geometry in which the longitudinal length of the microinjector 20 and the injection channel 14c are oriented perpendicular to the separation device 20. The perpendicular geometry results in significant dead volume at the junction of the microinjector 20 and the separation device 20. For a microinjector 12a having the scale as described above, the dead volume is estimated to be about 90-170 nL. This dead volume is likely to result in significant dispersion within a sample plug that could lead to peak broadening and tailing contrast.

In order to minimize the dead volume, and resulting dispersion within a sample plug, resulting from the perpendicular junction geometry, another embodiment of a microfluidic injector 12b according to the present invention is illustrated in FIG. 2B. The microfluidic injector 12b is the same as the microfluidic injector 12a shown in FIG. 2A, and described above, except that the microfluidic injector 12b is connected to the separation device 20 with a collinear junction geometry in which the longitudinal length of the microinjector 20 and the injection channel 14c are oriented collinear with the separation device 20. The collinear geometry of the microfluidic injector 12b results in a much smaller dead volume at the junction of the microfluid injector 20 and the separation device 20 than the perpendicular geometry. Indeed, the microfluid injector of FIG. 12b has nearly zero dead volume. The fabrication, operation and use of the microfluidic injector 12b is the same as the microfluidic injector 12c.

Turning to FIG. 2C, another embodiment of a microfluidic injector 12c according to the present invention is shown. The microfluidic injector 12c is substantially the same as the microfluidic injectors 12a, 12b, except that it is further configured to be capable of isolating a plug of sample of differing defined volumes. The substrate 70 of the microfluidic injector 12c further comprises a second waste channel 14g connected to the injection channel 14c between the fourth valve 16c and the fifth valve 16e. A seventh valve 16g (second wasted channel valve 16g) is disposed in the second waste channel 14g, and an eighth valve 16h (third injection channel valve 16h) is disposed in the injection channel 14c just before (at or proximate to) the junction to the injection channel 14c. A second sample chamber 19 having a second defined volume is formed in the injection channel 14c between the eighth valve 16h and the fourth valve 16c. As the second sample chamber 19 is only a portion of the first sample chamber 15, the second defined volume is less than the first defined volume. This feature allows a sample to be loaded into the injection channel 14c between eighth valve 16h and the fourth valve 16c wherein the plug of sample has the second defined volume.

In still another embodiment in which a plug of sample of differing volumes may be isolated may utilize a plug generator same or similar to the device and method described in Yi-Chun Chen, Kan Liu, Clifton Kwang-Fu Shen and R Michael van Dam, "On-demand generation and mixing of liquid in-gas slugs with digitally programmable composition and size," J. Micromech. Microeng. 25 (2015) 084006 (12pp). The plug generator contains two adjacent chambers, each of which has a volume that can be digitally adjusted by closing selected microvalves. By configuring the injection channel with additional microvalves to resemble one such adjustable-volume chamber, the micro-injector could be used to inject different sample volumes by adjusting the volume of the chamber prior to filling with sample.

Figure 3A:
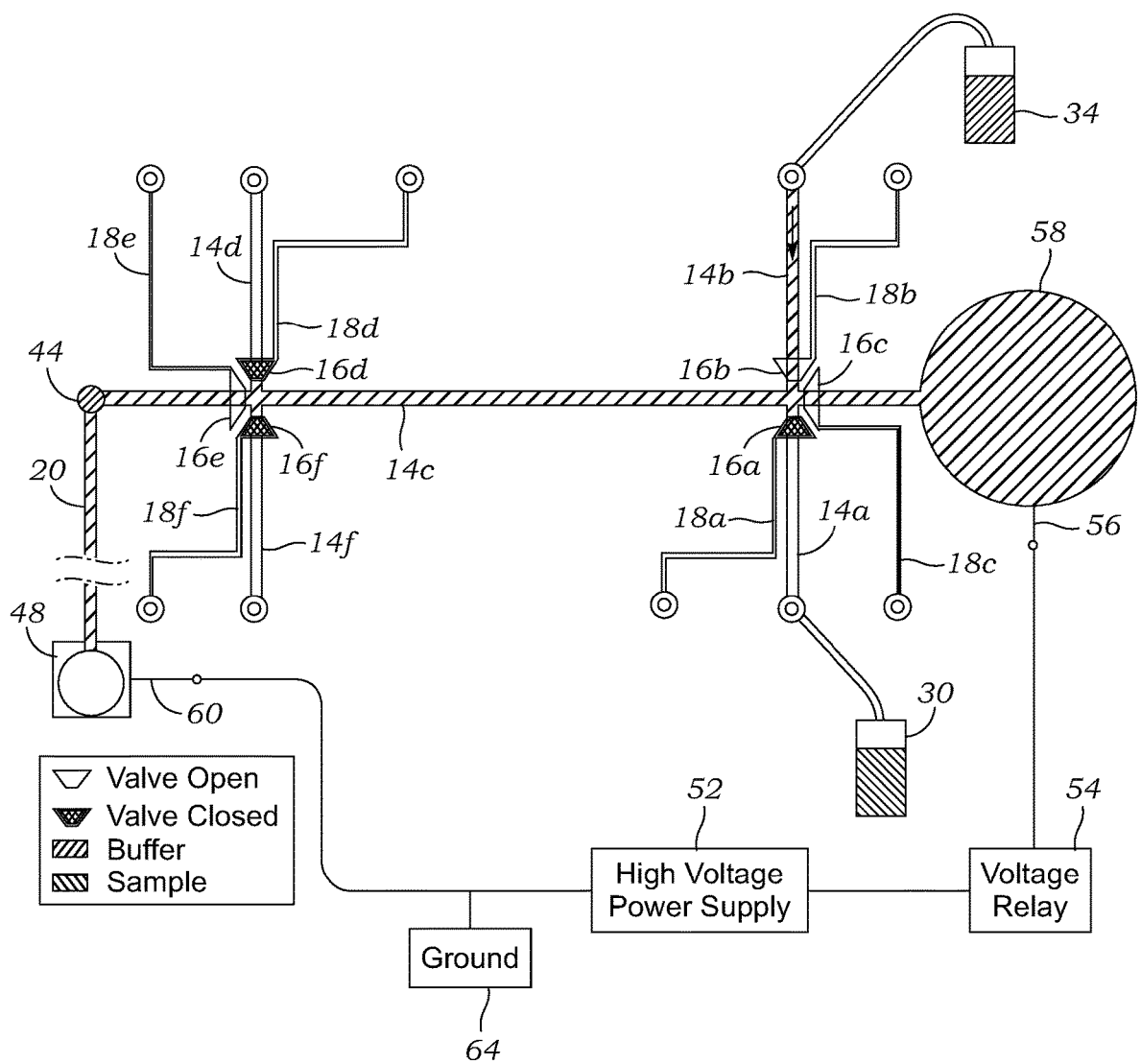
FIGS. 3A-3G are schematic views of the microfluidic injector device illustrating a sequence of steps or operations in a method of using the microfluidic injector device, according to one embodiment of the present invention.

Turning to FIGS. 3A-3G, a method of operation of the microfluidic injectors 12a, 12b, 12c to inject a plug of sample having the first defined volume into the separation device 20 will be described. As shown in FIG. 3A, various channels 14 of microfluidic injector 12 are first primed with a buffer. The second valve 16b, third valve 16d and fourth valve 16c are opened and the first valve 16a, fourth valve 16c and fifth valve 16e are opened and the first valve 16a, second valve 16b, third valve 16d, and sixth valve 16f are closed. The open or closed state of the valves 16 throughout the operation of microfluidic injector are controlled and actuated via the respective control channels 20 and the respective computer-controlled valves 22. The auxiliary waste channel 14f is not typically utilized in the operation of the microfluidic injector 12, and the sixth valve 16f remains closed through the operation of the microfluidic injector 12. Optionally, the third valve 16d may be opened during the priming step in order to prime the first waste channel 14d with buffer. Buffer is injected from the buffer source 34 into the buffer inlet channel 14b such that buffer flows into and fills the injection channel 14c, the buffer well 58, the separation device 20, and optionally the first waste channel 14d.

Figure 3B:
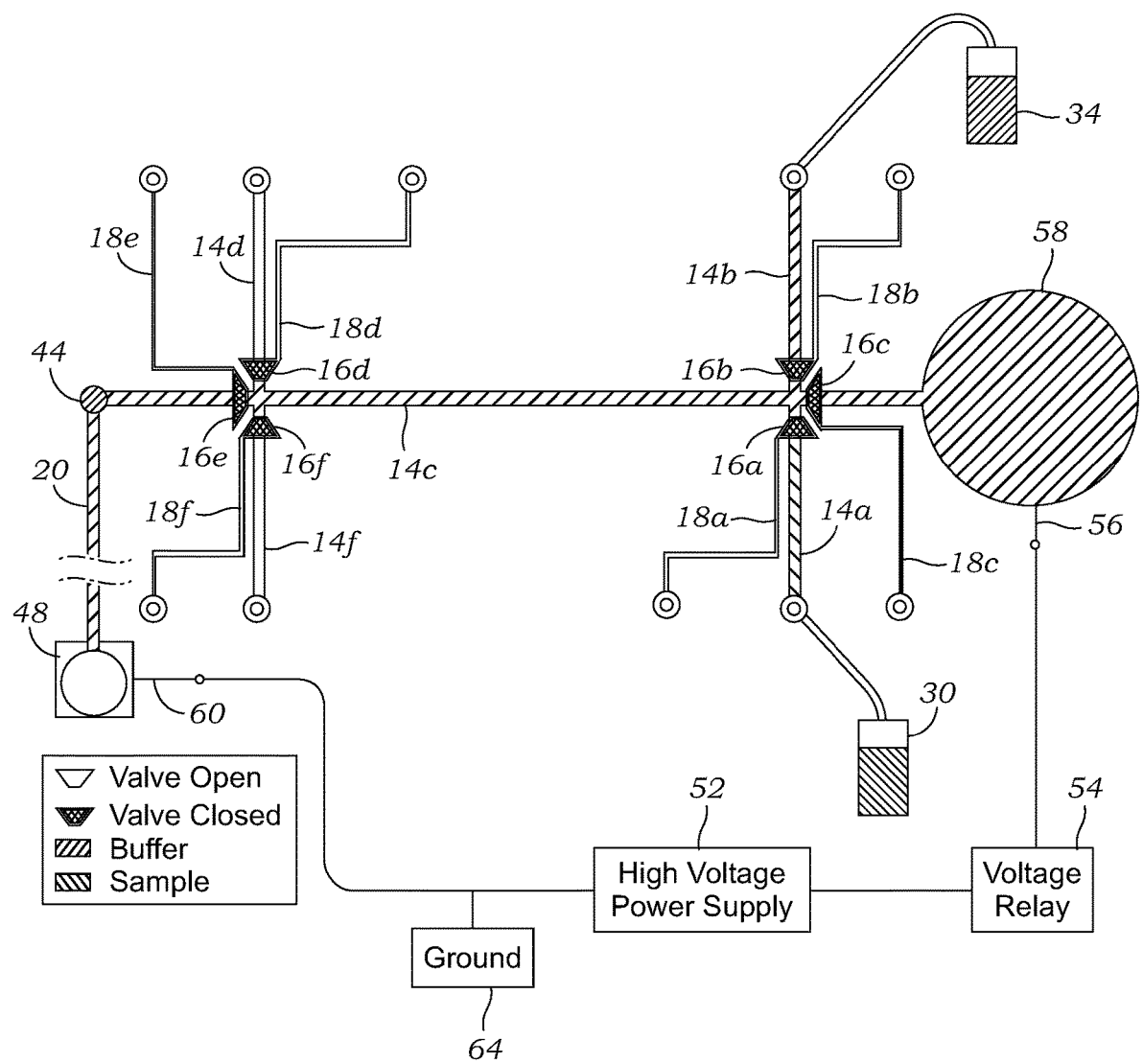

After the microfluidic injector 12 is primed with buffer, the sample inlet channel 14a may be primed with sample. This may be accomplished in two ways. In a first way, as shown in FIG. 3B, the sample source 30 may be pressurized to a higher pressure (e.g., about 10 psi) causing any air in the sample inlet channel 14a to permeate out through the substrate 70 until the sample inlet channel 14 is filled with sample up to the first valve 16a. Alternatively, the same procedure as shown in FIG. 3C for loading the first sample chamber 15 with sample may be performed until any air in the sample inlet channel 14a has passed through the first valve 16 and the third valve 16d.

Figure 3C:
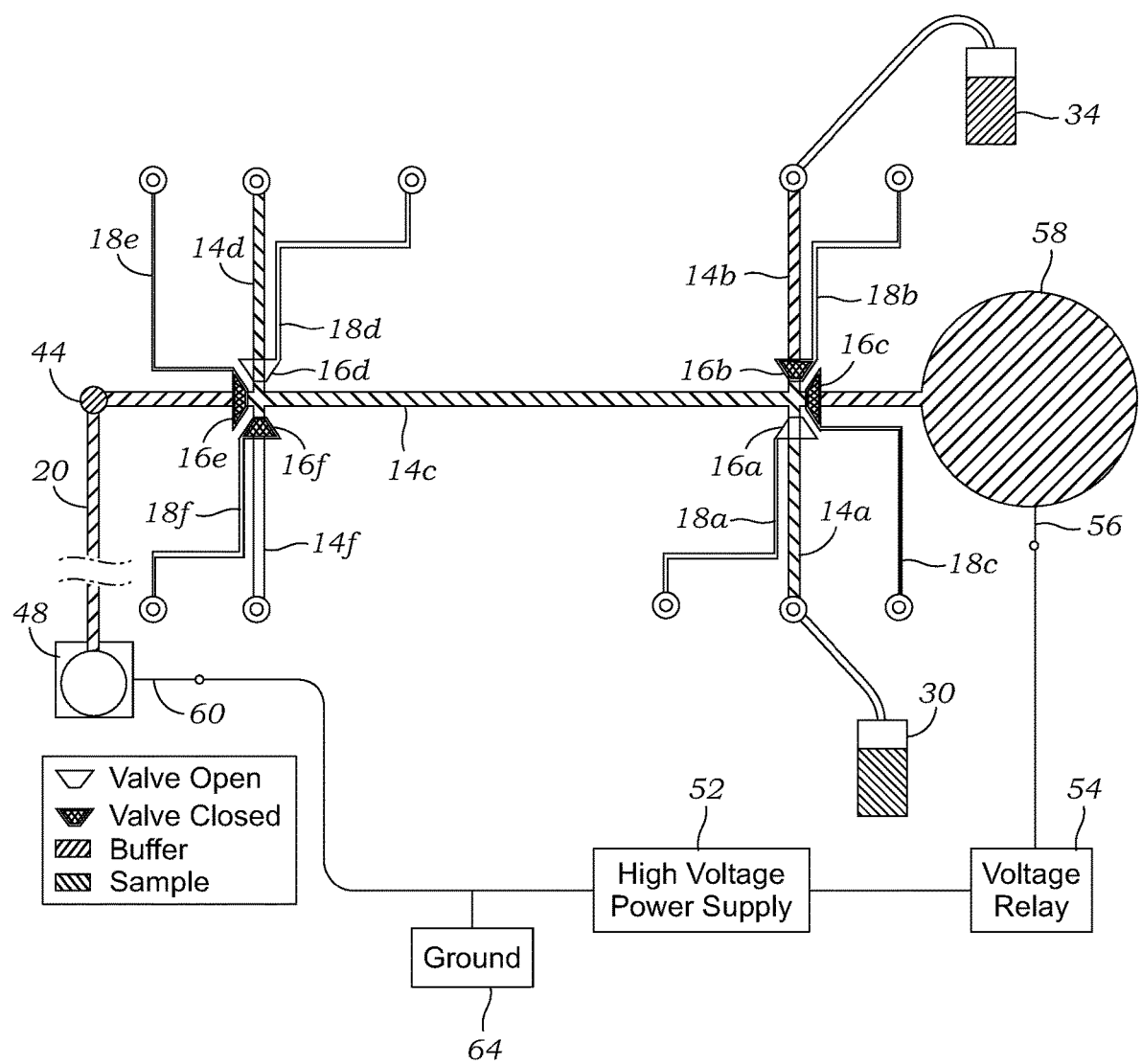

Next, as shown in FIG. 3C, the first sample chamber 15 is loaded with a sample. The first valve 16a and third valve 16d are opened, and the second valve 16b, fourth valve 16c and fifth valve 16e are closed. Sample is injected from the sample source 30 into the sample inlet channel 14a, and into the injection channel 14c and the first waste channel 14d, until sample fills the first sample chamber 15. A full first sample chamber 15 may be confirmed by detecting that sample is exiting the injection channel 14c through the first waste channel 14d.

Figure 3D:
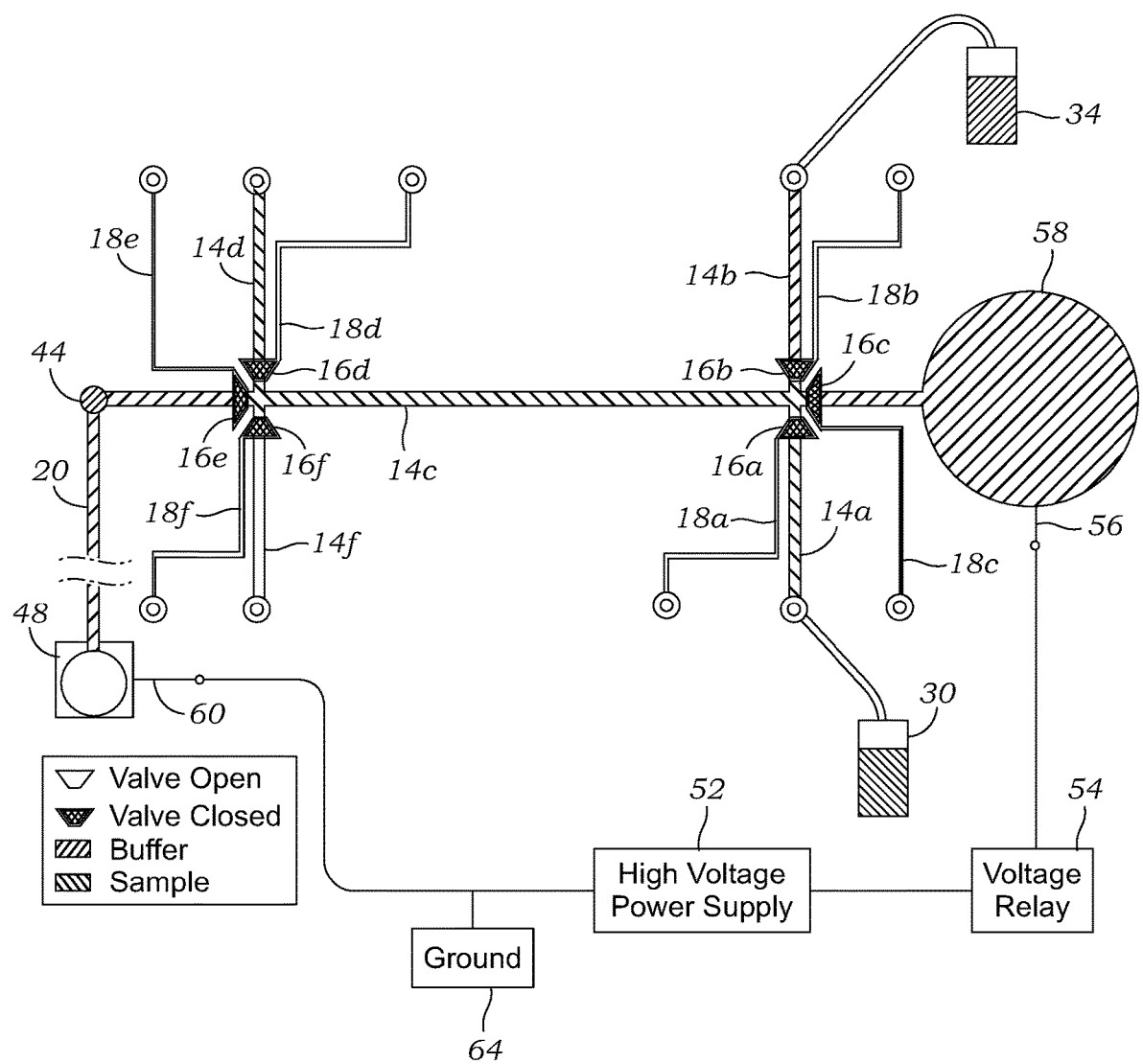

As shown in FIG. 3D, once the first sample chamber 14c is full, the first valve 16a and the third valve 16d are closed, such that a plug of sample having the first defined volume is contained in the first sample chamber 15 between the fourth valve 16c and the fifth valve 16e. The first valve 16a may be closed before the third valve 16d by a short time period (e.g., about 2-5 seconds) so that the plug of sample in the first sample chamber 15 is not pressurized by the sample pressure (typically about 1.5 psi). In other words, the sample pressure is vented through the first waste channel 14d.

Figure 3E:
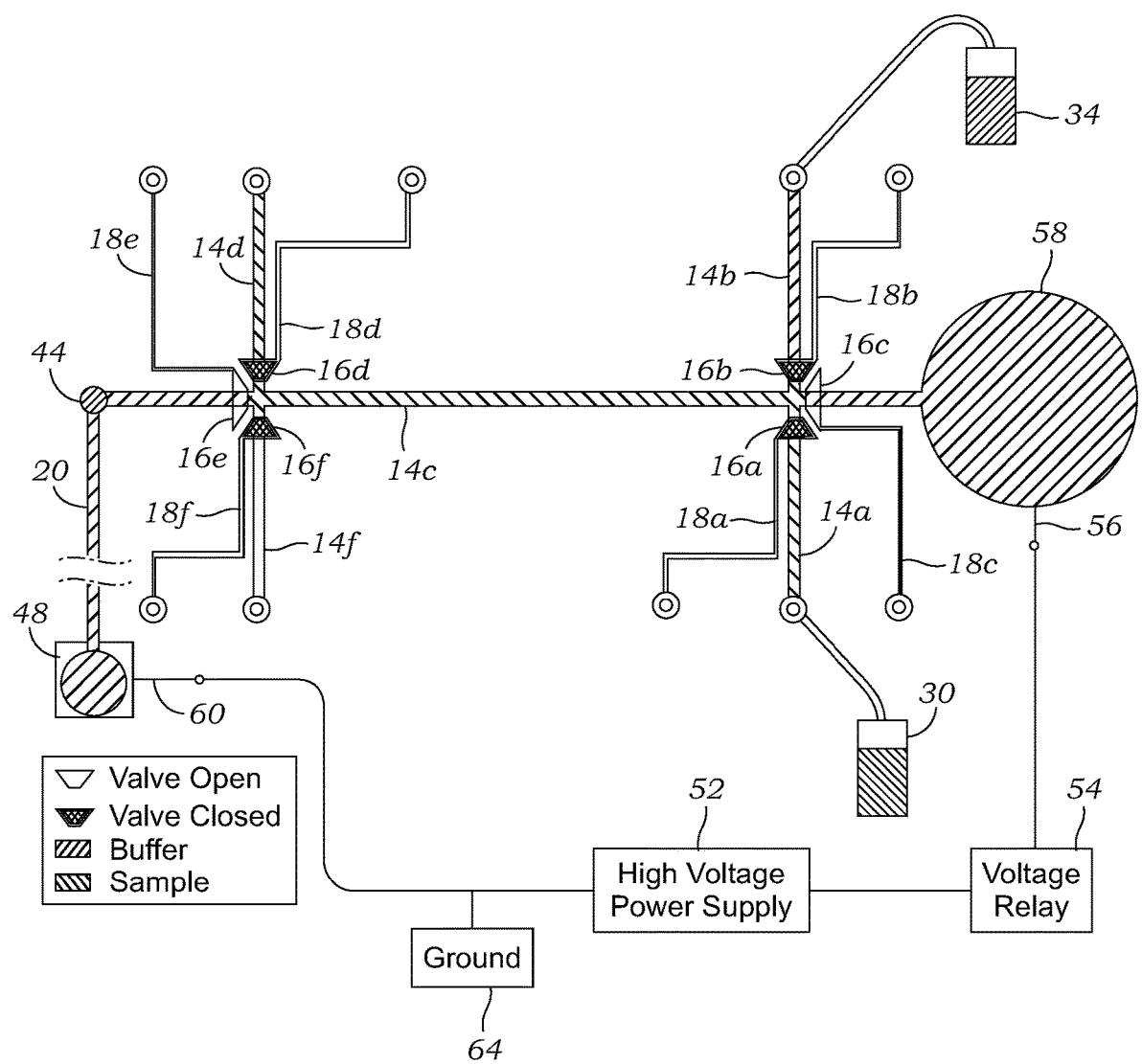
Figure 3F:
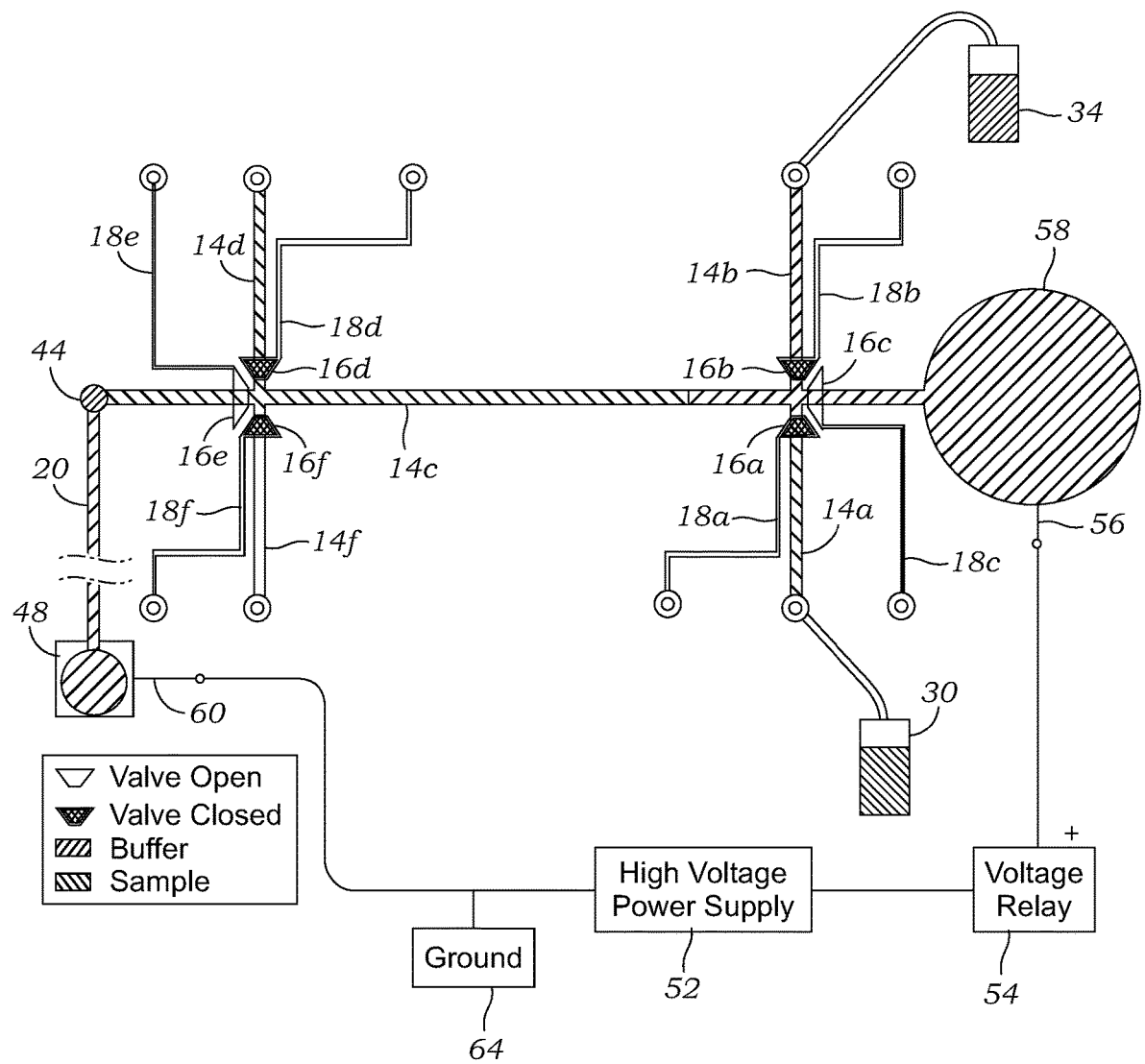
Figure 3G:
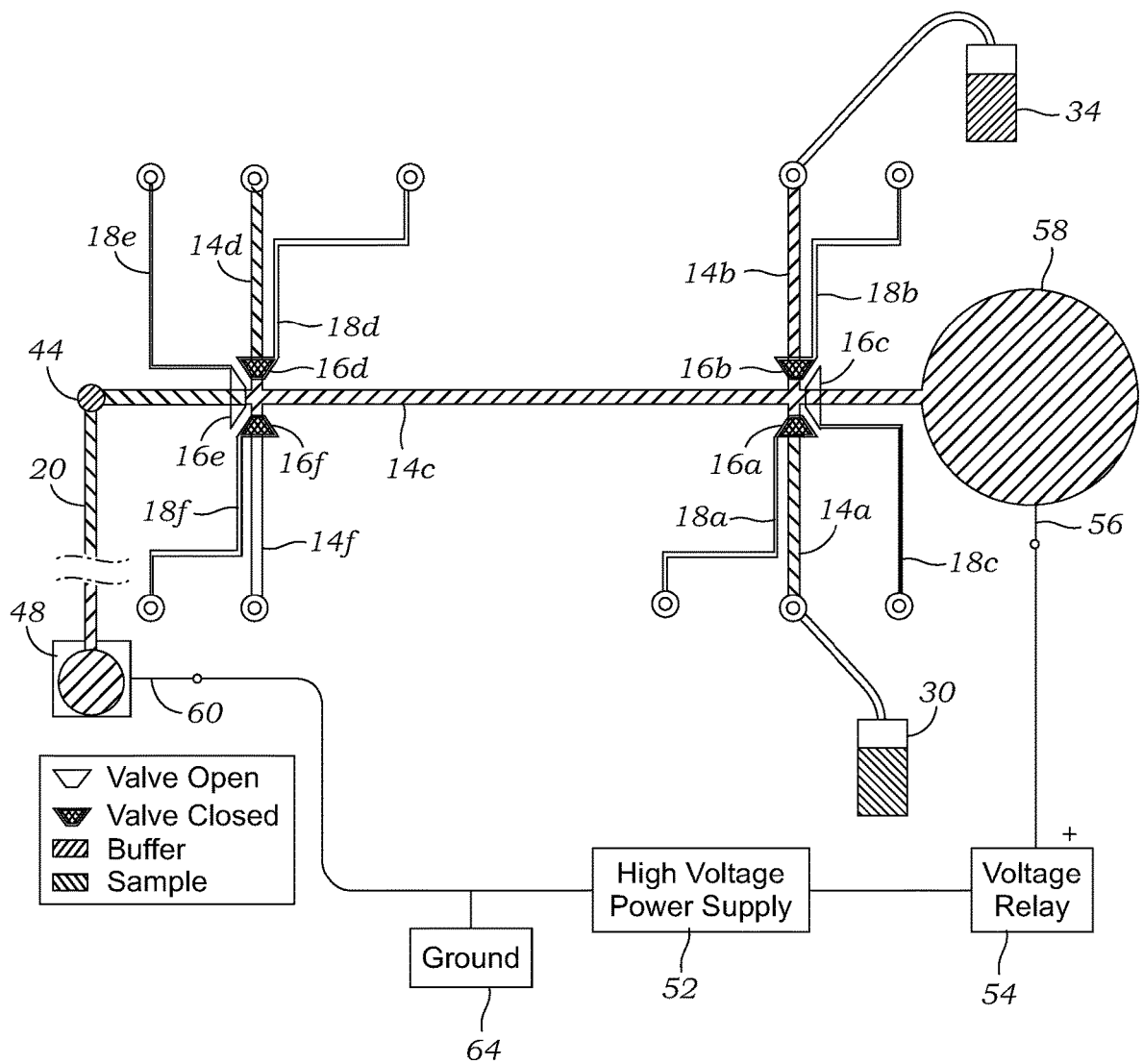

Next, as shown in FIG. 3E, the plug of sample is injected into the separation device 20 by applying a voltage across the injection channel 14c and the detection device 20. Before applying the voltage, the fourth valve 16c and fifth valve 16e are opened, and the first valve 16a, second valve 16b and third valve 16d are closed. The voltage causes the plug of sample to move downstream in the injection channel 14c toward the separation device 20, as shown in FIG. 3F. As shown in FIG. 3G, the plug of sample is injected into the separation device 20 and eventually past the light source 64 and spectrophotometer 66, as shown in FIG. 1.

The operation of the microfluidic injector 12c to isolate a plug of sample in the second sample chamber having the second defined volume is similar to the operation shown in FIGS. 3A-3G, except for the following. During the buffer priming step of FIG. 3A, the eighth valve 16h is open and seventh valve 16g may be closed. Alternatively, during the buffer priming step, the seventh valve may be open in order to prime the second waste channel 14g with buffer. During the sample loading step shown in FIG. 3C, the seventh valve 16g is opened and the eighth valve 16h is closed, and sample is injected from the sample source 30 into the sample inlet channel 14a, and into the injection channel 14c up to the eighth valve 16h, and into the second waste channel 14g, until sample fills the second sample chamber 19. A full second sample chamber 19 may be confirmed by detecting that sample is exiting the injection channel 14c through the second waste channel 14g. At the sample plug isolation step of FIG. 3D, seventh valve 16g and the eighth valve 16h are also closed such that a plug of sample having the second defined volume is contained in the second sample chamber 19 between the fourth valve 16c and the eighth valve 16h. Finally, in the sample plug injection steps shown in FIGS. 3E-3G, the eighth valve 16h is opened and the seventh valve 16g remains closed as the plug of sample is advanced through the injection channel 14c and is injected into the separation device 20 by applying the voltage across the injection channel 14c and the detection device 20.

EXAMPLES

Using a CE system in conformance with the CE system 10 illustrated in FIGS. 1 and 2, a number of experiments were performed to examine the performance of the microfluidic injector 12 of the present invention. In a first series of experiments, multiple injections of single-species samples (i.e., 50 mM thymidine in DI water, 50 mM 3'-deoxy-3'-flourothymidine (FLT) in acetonitrile-water mixture containing 5% acetonitrile (v/v)) were performed for each injection method (volumetric injection and timed injection) using the same chip. These are known byproducts and products during synthesis of the PET tracer [$^{18}$F]FLT.

A field of 200 V/cm (4 k VDC) was applied across the buffer well 58 of the micro-injector 12 and the waste well 48/outlet end of the silica capillary 20 (20 cm cm in length and 75 I.D.). To detect samples in the capillary 20, a detection cell having fiber optics for the spectrophotometer 66 and light source 64 was positioned 16 cm along the capillary 20. Using a custom-written LabView program, absorbance was recorded as a function of time since injection of a sample plug from the microfluidic injector 12 into the capillary 20 to create an electropherogram.

Prior to use, the microfluidic channels 14 of the chip and capillary surface were conditioned with 1M NaOH for 24 hr, then filled with 30 mM phosphate buffer containing 100 mM SDS. Separation proceeds by opening the ends of the flow path in the chip as described above and applying the separation voltage (4 kV). As a preliminary evaluation, repeatability was measured via injection of 50 mM thymidine. Repeatability was compared for volumetric injection as well as timed-injection. For the timed-injection, the sample inlet channel 14a was used as the sample inlet and the fifth valve 16e was opened for 600 ms to introduce sample plug into separation channel. The detected UV absorbance peaks (262 nm) in the resulting electropherograms were fit to Gaussian profile to determine retention time and area.

The performance of this new volumetric injection technique using the microfluidic injector 12 was compared to the common hydrodynamic injection technique of opening a micro-valve for a fixed amount of time. Measurements were repeated on three (3) different microfluidic injector chips 12 for each compound for each injection mode. The relative standard deviation (RSD) value of peak area was calculated for multiple runs to quantify the consistency of injected sample volume. For the viscosity study, samples consisted of 50 mM thymidine dissolved in DI water or in 30% glycerol/water (v/v) were used.

The volumetric injection mode showed lower peak area RSD indicating superior injection repeatability. Volumetric injection showed in some cases better performance with a relative standard deviation (RSD) of peak area as low as 1.04% (n=11) than the best RSD values reported in the literature for hydrodynamic micro-valve-based injection. It also showed considerably better performance than typically reported values for hydrodynamic micro-valve-based injection. Furthermore, in contrast to hydrodynamic injection, volumetric injection was found not to depend on sample viscosity.

Figure 4:
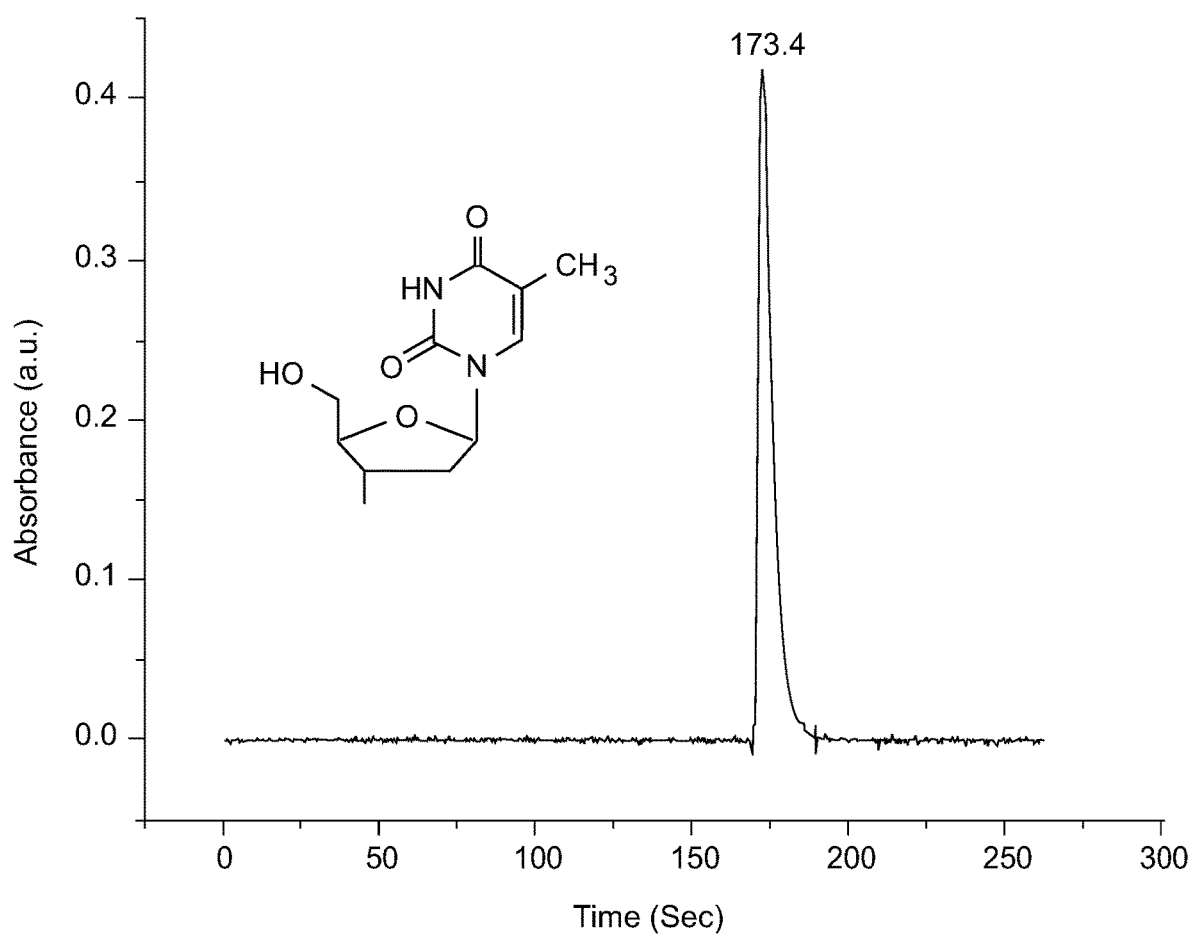
FIG. 4 illustrates an electropherogram of a single run of the microfluidic CE system according to the present invention.
Figure 5:
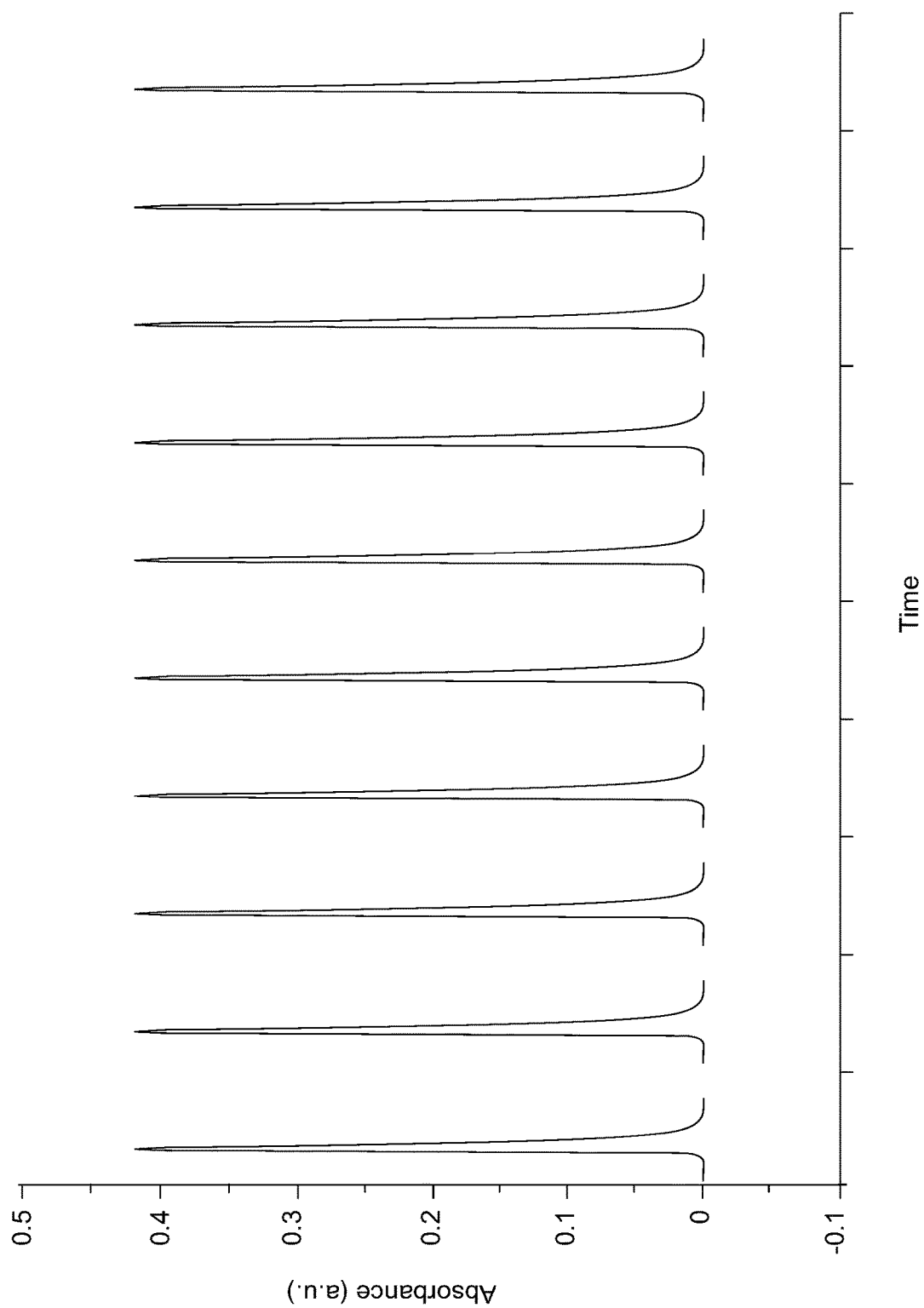
FIG. 5 illustrates an assembled electropherogram of 11 successive runs of the microfluidic CE system according to the present invention.

FIG. 4 illustrates the electropherogram of a single run of the micro-injector 12 using volumetric injection. FIG. 5 illustrates the UV absorbance peaks of 10 successive runs of CE in using the microfluidic injector 12, resulting in very low peak area RSD of 1.32% indicating highly repeatable sample injection, as compared to literature reports. The same chip operated in time-dependent injection mode resulted in a higher peak area RSD of 3.37%.

To avoid effects of buffer depletion (change in composition due to electroosmotic flow (EOF)), fresh buffer solutions were loaded manually between runs by pipette for initial experiments. This issue could instead be addressed by using larger volume buffer wells, or by using some on-chip microfluidic valves and pumps to exchange the well contents in between runs. Timed, hydrodynamic injection has an advantage that the injection volume can be changed simply by changing the time of valve opening. This can help accommodate different sized capillaries or sample concentrations. On the other hand, the volumetric chip has a fixed volume chamber and the tested design does not have the same flexibility. To increase injection volume flexibility, valve-based approaches where the length of the chamber is dynamically adjusted can be readily incorporated as has been previously shown in the embodiment of FIG. 2C. (See, e.g., Y.-C. Chen, K. Liu, C. K.-F. Shen, and R. M. van Dam, "On-demand generation and mixing of liquid-in-gas slugs with digitally programmable composition and size," *J. Micromechanics Microengineering*, vol. 25, no. 8, p. 084006, August 2015.

Figure 7:
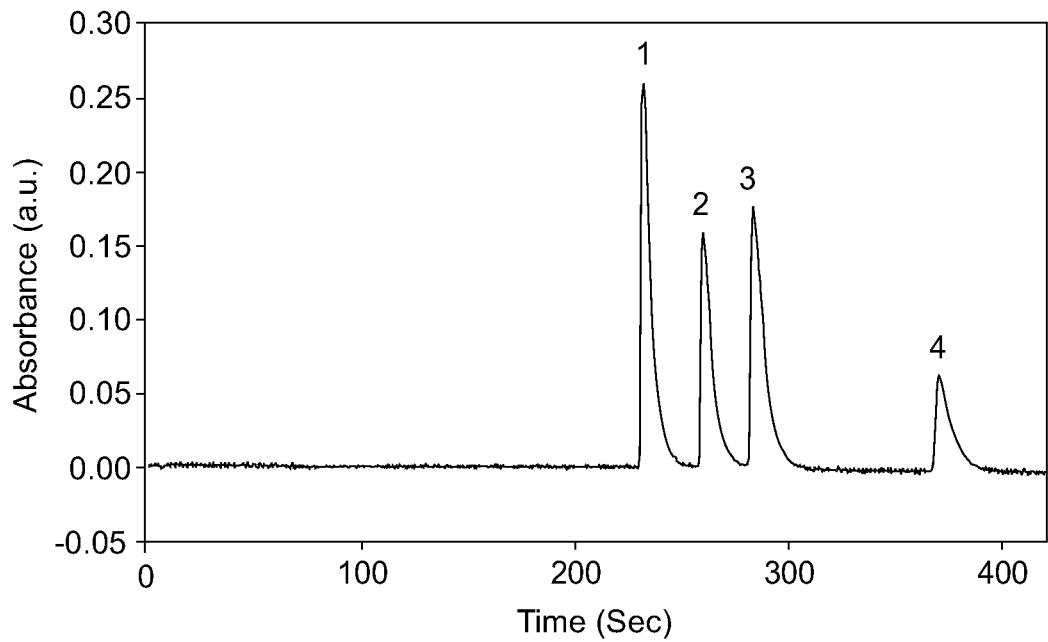
FIG. 7 is an electropherogram of a single run of the microfluidic injector CE system with a microfluidic injector having a perpendicular junction in separating a mixture of 4 compounds using volumetric injection, according to the present invention.
Figure 8:
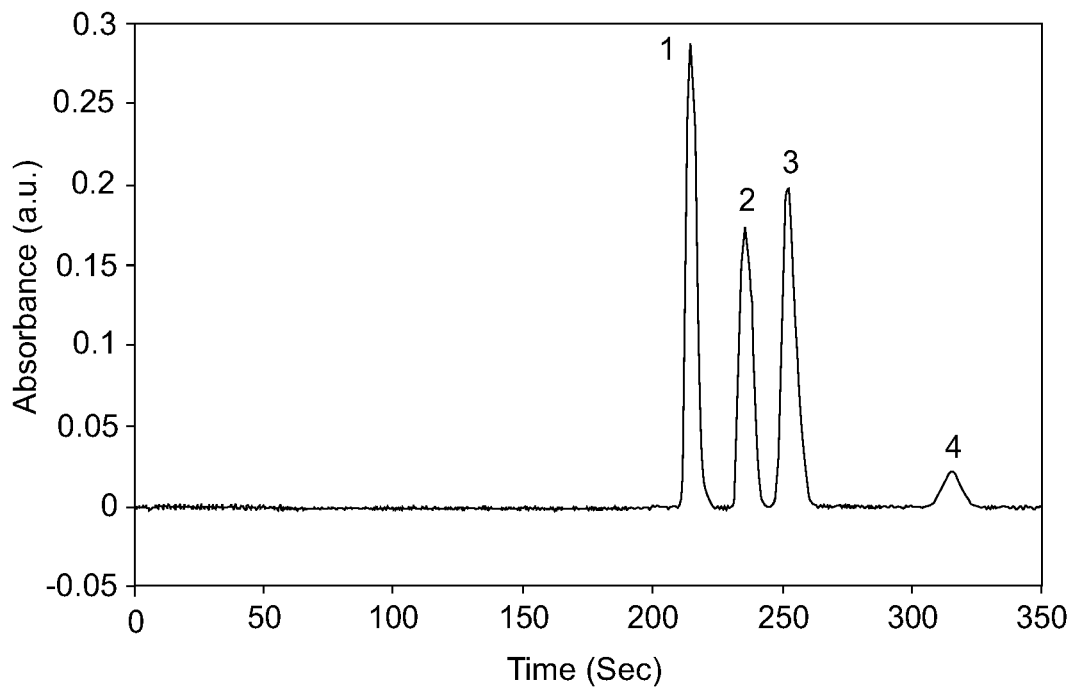
FIG. 8 is an electropherogram of a single run of the microfluidic injector CE system having a collinear junction in separating a mixture of 4 compounds using electrokinetic injection.

Another series of experiments was conducted to examine the ability to separate multiple compounds, and to compare results of volumetric injection (with the two different junction geometries, namely the perpendicular junction of the embodiment of FIG. 2A and the collinear junction of the embodiment of FIG. 2B) as well as the widely-used approach of electrokinetic injection. To avoid introducing additional variables, similar injection volume was used in all three different injection modes. Baseline separation of a mixture of 4 compounds was achieved using the microfluidic injector 12 with the collinear junction. FIG. 7 is an electropherogram of a single run of the microfluidic injector 12a having the perpendicular junction in separating a mixture of 4 compounds using volumetric injection. For comparison, FIG. 8 is an electropherogram of a single run of the microfluidic injector 12b having the collinear junction in separating a mixture of 4 compounds using electrokinetic injection.

Peak area RSD values for the 4 compounds and various injection methods are summarized in Table 1 shown in FIG. 9. It can be seen that the capillary-to-chip junction geometry does not significantly affect the sample injection repeatability. This is expected because the injected sample amount is physically metered within the injection chamber before even seeing the junction. For volumetric injection, the peak area RSD was always <2.0% and values as low as 0.55% were observed. When electrokinetic injection was performed in the same chip with the same injection volume (as verified by comparing peak areas), the peak area RSD was found to be substantially higher, indicating less consistent sample injection. From these results and the comparison of volumetric and timed injection presented earlier, it appears that sample injection repeatability is mainly influenced by the injection method.

The microfluidic injector 12 of the Examples described herein used a hybrid of a capillary 20 and a microfluidic injector chip 12. In an alternative embodiment, the capillary 20 could be replaced by a microchannel within the microfluidic injector chip 12 itself. A UV absorbance detector (or other detection methods) can also be implemented directly in the microfluidic injector chip 12 by a variety of fabrication methods. That is the UV detector functionality may be implemented directly in the microfluidic injector 12 or in another chip that is coupled thereto. It is contemplated by the present invention that the microfluidic injector 12 could be integrated into fully-inclusive lab-on-a-chip platforms for a variety of MCE-based applications. In addition to optical detection, other modalities such as radiation detection, pH measurement and impedance measurement can be incorporated to further increase the flexibility of samples that can be analyzed.

The microfluidic injector 12 could be integrated into more complex lab-on-a-chip systems. For example, for QC testing of pharmaceuticals or radiolabeled imaging agents, there are a variety of other tests that are needed including sterility, pH, color, etc. It is likely that a compact device could be built, that along with MCE methods for chemical/radiochemical purity, would be able to test such samples.

The microfluidic injector 12 described herein offers several advantages over current methods. First, the microfluidic injector 12 provides for highly repeatable sample injection eliminating known sample injection biases. This volumetric microfluidic injector 12 for CE can eliminate variables that are still present when using hydrodynamic injection. Furthermore, bias-free precise quantitative analysis is possible independent of varying fluid properties (e.g., sample with varying viscosity). In addition, multiple successive injections of the same sample can be performed without changing the sample composition as occurs with hydrodynamic injection. The microfluidic injector 12 may be made using standard PDMS-based fabrication techniques. While larger scale CE platforms can attain high injection repeatability than typical MCE platforms via hydrodynamic injection. However, miniaturization is important for many applications where compactness, portability, and/or low cost are needed. Miniaturization, in fact, has even further advantages, including lower sample consumption, improved resolution, shorter separation times, improved reproducibility (e.g., from improved temperature control), and increased sensitivity and diversity of detection methods. Thus, it is desirable to boost the repeatability of MCE methods to the repeatability of traditional CE methods or better. The microfluidic injector 12 accomplishes this. The microfluidic injector 12 may be used in any CE application where quantitation and thus volume repeatability is needed, including the chemical purity analysis of pharmaceuticals and radiopharmaceuticals. Many other applications in the field of analytical chemistry where precise and reliable measurements of compound concentrations are needed could also benefit from this invention.

While embodiments of the present invention have been shown and described, various modifications may be made without departing from the scope of the present invention. The invention, therefore, should not be limited, except to the following claims, and their equivalents.

What is claimed is:

1. A capillary electrophoresis system comprising:
a microfluidic injector comprising:
   a substrate having an injection channel having a first end connected to a buffer supply and a second end connected to a separation device, a sample inlet channel connected to the injection channel, a buffer inlet channel connected to the injection channel, and a first waste channel connected to the injection channel;
   a selectively controllable first valve disposed in the sample inlet channel;
   a selectively controllable second valve disposed in the buffer inlet channel;
   a selectively controllable third valve disposed in the first waste channel;
   a selectively controllable fourth valve disposed in the injection channel and positioned such that closing the fourth valve seals the buffer supply from the sample inlet channel, the buffer inlet channel and the first waste channel;
   a selectively controllable fifth valve disposed in the injection channel and positioned such that closing the fifth valve seals the separation device from the sample inlet channel, the buffer inlet channel and the first waste channel, and wherein a first sample chamber having a first defined volume is formed in the injection channel by and between the fourth valve and the fifth valve;
   a power supply configured to apply a capillary electrophoresis separation voltage between the buffer supply and an output of the separation device and across the injection channel so as to drive a sample located in the injection channel between the fourth valve and the fifth valve through the separation device;
   wherein the sample inlet channel, the buffer inlet channel, and the first waste channel connect to the injection channel between the fourth valve and the fifth valve; and
   wherein the separation device is selected from the group consisting of: a silica capillary; a capillary channel formed in the substrate; and a capillary channel disposed on the substrate.

2. The capillary electrophoresis system of claim 1, wherein the first valve, second valve, third valve, fourth valve and fifth valve are pressure actuated valves and the substrate further comprises separate control channel connected to each of the first valve, second valve, third valve, fourth valve and fifth valve for selectively controlling the respective valve.

3. The capillary electrophoresis system of claim 2, wherein each of the first valve, second valve, third valve, fourth valve and fifth valve are push-up valves.

4. The capillary electrophoresis system of claim 2, wherein the substrate is formed of a polymer material, and the injection channel, the sample inlet channel, the buffer inlet channel, the first waste channel, and the separate control channels are formed in the polymer material using photolithography.

5. The capillary electrophoresis system of claim 2, wherein:
   the substrate comprises a first layer of poly(dimethylsiloxane) bonded to a second layer of poly(dimethylsiloxane);
   the injection channel, the sample inlet channel, the buffer inlet channel, the first waste channel, are formed in the first layer using photolithography;
   the separate control channels are formed in the second layer using photolithography; and
   the second layer is bonded to a third layer thereby closing the separate control channels.

6. The capillary electrophoresis system of claim 1, wherein the buffer supply is one of a buffer well disposed on the substrate, a buffer reservoir disposed on the substrate, and a buffer container connected to the first end of the injection channel via a tube.

7. The capillary electrophoresis system of claim 1, wherein the first valve, second valve, third valve, fourth valve and fifth valve are pressure actuated valves, the substrate further comprises separate control channel connected to each of the first valve, second valve, third valve, fourth valve and fifth valve for selectively controlling the respective valve, and the capillary electrophoresis system further comprises a respective computer-controlled valve connected to each control channel to independently control actuation of a respective one of the first valve, second valve, third valve, fourth valve and fifth valve.

8. The capillary electrophoresis system of claim 1, wherein the first defined volume of the first sample chamber is from 1 nL to 10 nL.

9. The capillary electrophoresis system of claim 1, wherein each of the injection channel, the sample inlet channel, the buffer inlet channel and the first waste channel are less than 100 µm in width.

10. The capillary electrophoresis system of claim 1, wherein each of the injection channel, the sample inlet channel, the buffer inlet channel and the first waste channel are less than 250 µm in width.

11. The capillary electrophoresis system of claim 1, wherein:
   the substrate further comprises a second waste channel connected to the injection channel between the fourth valve and fifth valve;
   a selectively controllable seventh valve disposed in the second waste channel; and
   a selectively controllable eighth valve disposed in the injection channel proximate the connection between the second waste channel and the injection channel such that a second sample chamber having a second defined volume is formed in the injection channel between the eighth valve and the fourth valve, wherein the second defined volume is less than the first defined volume.

12. The capillary electrophoresis system of claim 1, wherein the substrate is formed of a polymer material, and the injection channel, the sample inlet channel, the buffer inlet channel and the first waste channel are formed in the polymer material using photolithography.

13. The capillary electrophoresis system of claim 1, wherein the substrate is formed of one or more layers of a material selected from the group consisting of poly(dimethylsiloxane) and perfluoropolyether, and the injection channel, the sample inlet channel, the buffer inlet channel and the first waste channel are formed in the one or more layers of the material using photolithography.

14. The capillary electrophoresis system of claim 1, wherein the microfluidic injector is connected to the separation device with a collinear junction geometry.

* * * * *